(12) United States Patent
Terai et al.

(10) Patent No.: US 6,424,383 B1
(45) Date of Patent: Jul. 23, 2002

(54) APPARATUS FOR CORRECTING VERTICAL CONTOURS

(75) Inventors: Katsumi Terai, Higashiosaka; Naoji Okumura, Mino; Yutaka Nio, Osaka; Kazuhito Tanaka, Otsu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/284,876

(22) PCT Filed: Aug. 24, 1999

(86) PCT No.: PCT/JP98/03753
§ 371 (c)(1),
(2), (4) Date: Apr. 22, 1999

(87) PCT Pub. No.: WO99/11055
PCT Pub. Date: Mar. 4, 1999

(30) Foreign Application Priority Data

Aug. 26, 1997 (JP) .............................. 9-229229

(51) Int. Cl.$^7$ ........................... H04N 5/21; H04N 5/208
(52) U.S. Cl. ..................... 348/628; 348/606; 348/607; 348/625
(58) Field of Search ................................. 348/606, 607, 348/623, 625, 627, 628, 629; 382/266; H04N 5/21, 5/208

(56) References Cited

U.S. PATENT DOCUMENTS

| | | | | |
|---|---|---|---|---|
| 4,573,075 A | * | 2/1986 | Bolger ......................... | 348/623 |
| 4,916,542 A | * | 4/1990 | Yoneda et al. .............. | 348/622 |
| 5,144,399 A | | 9/1992 | Nakayama et al. ......... | 348/607 |
| 5,151,787 A | | 9/1992 | Park ............................ | 348/607 |
| 5,170,248 A | * | 12/1992 | Min ............................ | 348/622 |
| 5,214,510 A | | 5/1993 | Kobayashi .................. | 348/607 |
| 5,561,473 A | * | 10/1996 | Saionji et al. .............. | 348/628 |
| 5,635,990 A | | 6/1997 | Yi ............................... | 348/606 |
| 5,715,000 A | * | 2/1998 | Inamori ....................... | 348/607 |
| 5,767,900 A | * | 6/1998 | Tanji et al. .................. | 348/625 |
| 5,956,095 A | * | 9/1999 | Taketani et al. ............ | 348/607 |
| 6,144,800 A | * | 11/2000 | Kobayashi .................. | 348/607 |
| 6,169,583 B1 | * | 1/2001 | Merki et al. ................ | 348/607 |

FOREIGN PATENT DOCUMENTS

| | | |
|---|---|---|
| EP | 0 529 903 | 3/1993 |
| EP | 0 700 216 | 3/1996 |

OTHER PUBLICATIONS

Patent Abstracts of Japan, vol. 013, No. 176 (E–749), Apr. 25, 1989 (Apr. 25, 1989) & JP 01 005168 A (Toshiba Corp), Jan. 10, 1989 (Jan. 10, 1989), * abstract *.
Patent Abstracts of Japan, vol. 016, No. 389 (E–1250), Aug. 19, 1992 (Aug. 19, 1992), & JP 04 126470 A (Toshiba Corp), Apr. 27, 1992 (Apr. 27, 1992), * abstract *.

* cited by examiner

*Primary Examiner*—John Miller
*Assistant Examiner*—Brian Yenke
(74) *Attorney, Agent, or Firm*—Wenderoth, Lind & Ponack, L.L.P.

(57) ABSTRACT

An object is to provide a vertical contour correcting device for a video signal which reduces noise without deteriorating effect of the entire contour correction.

A vertical contour correcting device (VCP1) which corrects vertical contour components (S1v, S1v') of a video signal (S1) with a given quantity of correction (K) to enhance the vertical contour (Ev) of the video signal (S1) comprises a vertical contour component extracting device (3) for detecting said vertical contour components (S1v, S1v') from said video signal (S1), a vertical contour component correlation detector (3, 29, 8c, 8d, 4) for detecting correlation between horizontally adjacent vertical contour components (Sb, Sb', Sb'') from said detected vertical contour components (S1v, S1v'), and a controller (5) for determining said quantity of correction (K) on the basis of said detected correlation (Sj1), thereby varying the quantity of correction (K) in accordance with the correlation (Sj1).

12 Claims, 21 Drawing Sheets

APPARATUS FOR CORRECTING VERTICAL CONTOURS

TECHNICAL FIELD

The present invention relates to a vertical contour correcting device for a video signal utilized in a television receiver etc.

BACKGROUND ART

Referring to FIGS. 19, 20, 21, 22 and 23, an example of a conventional vertical contour correcting circuit will now be described. As shown in FIG. 19, the conventional vertical contour correcting device VCC has an input port 1, a vertical contour component extracting device 3, an adder 7, a non-linear processor 18, and an output port 2. The input port 1 receives input of a digital video signal S1 from an external video signal source (not shown). The vertical contour component extracting device 3 is connected to the input port 1 and extracts vertical contour components of the input digital video signal S1 to generate a vertical contour component signal S1v, and it also delays the present video signal S1 to be corrected for one line to generate a primary delayed digital video signal S1'.

FIG. 20 shows the structure of the vertical contour component extracting device 3 in detail. The vertical contour component extracting portion 3 includes a first one-line delay unit 19, a second one-line delay unit 20, a first coefficient unit 21, a second coefficient unit 22, a third coefficient unit 23, and an adder 24. The first one-line delay unit 19 and the first coefficient unit 21 are connected to the input port 1 to receive the input of the digital video signal S1 together. The first one-line delay unit 19 delays the digital video signal S1 by one line to generate the primary delayed digital video signal S1'. The first coefficient unit 21 multiplies the digital video signal S1 by a first coefficient K1 to attenuate the present digital video signal S1 and generates a first digital video sub-signal S1S. While the first coefficient K1 can take an arbitrary value, K1=−¼ in this example.

The second one-line delay unit 20 and the second coefficient unit 22 are connected to the first one-line delay unit 19 to receive input of the primary delayed digital video signal S1'. The one-line delay unit 20 further delays the input primary delayed digital video signal S1' by one line to generate a secondary delayed digital video signal S1''. The second coefficient unit 22 multiplies the input primary delayed digital video signal S1' by a second coefficient K2 to attenuate the primary delayed digital video signal S1' and generates a second digital video sub-signal S1'S. As stated above, the adder 7 (FIG. 19) is connected to the first one-line delay unit 19 to obtain the input of the primary delayed digital video signal S1'.

The third coefficient unit 23 is connected to the one-line delay unit 20 to receive input of the digital video signal S1''. The coefficient unit 23 multiplies the digital video signal S1'' by a third coefficient K3 to attenuate the digital video signal S1'' and generates a third digital video sub-signal S1''S. The above-mentioned three coefficients K1, K2 and K3 can take such arbitrary values smaller than one, such that the sum of the three coefficients is equal to zero. In this example, the values are set as K1=−¼, K2=½, and K3=−¼. The vertical contour component extracting device 3 can be a vertical filter structure providing a desired frequency characteristic.

The adder 24 is connected to the first coefficient unit 21, second coefficient unit 22, and coefficient unit 23 to receive input of the first digital video sub-signal S1S, second digital video sub-signal S1'S, and third digital video sub-signal S1''S. The adder 24 adds the three input digital video sub-signals S1S, S1'S, and S1''S which are respectively delayed for one line to generate and output the vertical contour component signal S1v to the non-linear processor 18 (FIG. 19).

FIG. 21 shows the structure of the non-linear processor 18. The non-linear processor 18 includes a coring circuit 25, a horizontal low-pass filter 26, a sequential coefficient unit 27, and a limiter 28. The coring circuit 25 is connected to the adder 24 in the vertical contour component extracting device 3 to receive input of the vertical contour component signal S1v. The coring circuit 25 then applies noise-removal to the vertical contour component of the input vertical contour component signal S1v to generate a first vertical contour component signal.

The horizontal low-pass filter 26 is connected to the coring circuit 25 to receive input of the first vertical contour component signal. The horizontal low-pass filter 26 then removes high-frequency component of the input vertical contour component signal to generate a second vertical contour component signal.

The sequential coefficient unit 27 is connected to the horizontal low-pass filter 26 to receive input of the second vertical contour component signal. The sequential coefficient unit 27 multiplies the input second vertical contour signal by a given coefficient to generate a first vertical contour correction signal.

The limiter 28 is connected to the sequential coefficient unit 27 to receive input of the first vertical contour correction signal. The limiter 28 then applies given band limitation to the first vertical contour correction signal to generate a second vertical contour correction signal S1vc.

Referring back to FIG. 19 again, as stated above, the non-linear processor 18 applies non-linear processing to the vertical contour component signal S1v outputted from the vertical contour component extracting device 3 to generate the vertical contour correction signal S1vc.

The adder 7 is connected to the first one-line delay unit 19 in the vertical contour component extracting device 3 and the non-linear processor 18 to receive input of the primary delayed digital video signal S1' to be corrected and the second vertical contour correction signal S1vc. The adder 7 then adds the input vertical contour correction signal S1vc and primary delayed digital video signal S1' to reproduce a vertical contour corrected video signal S1C with corrected vertical contour. The vertical contour corrected video signal S1C is externally outputted through the output port 2.

FIG. 2 shows an image represented by the digital video signal S1. In FIG. 2, the ordinate shows the vertical scanning direction Dv of the image, and the abscissa shows the horizontal scanning line direction Dh. In this image, ○ indicates a pixel representing the image. FIG. 2 shows an example in which the digital video signal S1 is represented by pixels PA, PB and PC at three different levels.

That is to say, they are first-level pixels PA indicated by ○ containing A, second-level pixels PB indicated by ○ containing B, and third-level pixels PC indicated by ○ containing C.

All pixels on the horizontal line L0 and line L1 and the pixels on the horizontal line L2 except the pixel on the vertical line α are the first-level pixels PA. The pixel on the vertical line α on the horizontal line L2 is the second-level pixel PB. All pixels on the horizontal lines L3 and L4 are the third-level pixels PC. When the levels of the pixels PA, PB, and PC are represented as Lpa, Lpb, and Lpc, they are in the relation Lpa>Lpc>Lpb. That is to say, in this case, the pixel PB on the vertical line α and the horizontal line L2 is an impulse noise. The presence of such impulse noise is likely to cause the viewers to feel as if the S/N ratio of the image is deteriorated.

FIG. 22 shows signal levels of the digital video signal S1 and the vertical contour corrected video signal S1C in the horizontal positions α−1 and α+1. For the vertical contour corrected video signal S1C, ○ with P and ○ with N respectively indicate contour pixels PP and PN. The contour pixel PA corresponds to the contour pixel PA on the L1 line in the digital video signal S1, and the contour pixel PN corresponds to the contour pixel PC on the L3 line in the digital video signal S1. In this example, the pixel PB as an impulse noise source in the digital video signal S1 is not present in the horizontal positions α−1 and α+1 as shown in FIG. 2.

Accordingly correction by the non-linear processor 18 corrects the signal level of the contour pixels without any problem. That is to say, as a result of the correction by the vertical contour correcting device VCC, the line connecting the contour pixels PP and PN after correction becomes steeper than the line connecting the pixel PA and the pixel C on the L3 line as the contour pixels of the digital video signal S1. The vertical contour of the digital video signal S1 is thus corrected and enhanced by the vertical contour correcting device VCC.

FIG. 23 shows signal levels of the digital video signal S1 and the vertical contour corrected video signal S1C in the horizontal position α. For the vertical contour corrected video signal S1C, ○ with I indicates the impulse noise source pixel PI. As shown in this diagram, the digital video signal S1 contains the impulse pixel PB at which the signal level partially projects between the vertical contour pixels PA and PC. When this digital video signal S1 is corrected in vertical contour by the vertical contour correcting device VCC, the correction by the non-linear processor 18 is uniformly applied to all pixels in the digital video signal S1.

As a result, while the signal levels of the vertical contour pixels PA (the L2 line) and PN are both raised, the signal level of the impulse noise is lowered. As a result, the slope of the line of the pixels PP-PI and that of the line of the pixels PI-PN in the vertical contour corrected video signal S1C, respectively corresponding to the line PA-PB connecting the contour pixel PA and the impulse pixel PB and the line PB-PC connecting the impulse pixel PB and the other contour pixel PC in the digital video signal S1, both become steeper than those in the digital video signal S1.

That is to say, it is seen that the impulse noise contained in the digital video signal S1 is enhanced by the vertical contour correction by the vertical contour correcting device VCC and the effect of correcting the vertical contour is deteriorated.

In this way, the conventional contour correcting device has the problems that the noise removal achieved by using the coring circuit reduces the effect of the entire contour correction, that presence of noise causes the vertical contour correction to work in opposite direction, and that the horizontal low-pass filter to the vertical contour components extends the correction in the horizontal direction.

The present invention has been made to solve the above-mentioned problems, and its object is to provide a vertical contour correcting device which reduces noise in accordance with correlation between video signals adjacent in the horizontal direction without deteriorating the effect of the entire contour correction in a vertical contour correcting device for enhancing vertical contour components of the video signal.

That is to say, it corrects vertical contour enhancement by reducing the inclination of the pixels PI-PN in FIG. 23 so that the impulse noise pixel PI after the vertical contour enhancement becomes closer to the impulse noise pixel PB existing before the vertical contour enhancement. Furthermore, preferably, it adjusts the vertical contour correction to further reduce the effect of noise component by inverting the levels of the impulse noise pixel PI and the contour pixel PN after the vertical contour enhancement. In this way, its object is to provide a vertical contour correcting device which applies contour correction to an image while effectively preventing impulse noise component from being enhanced during the vertical contour correction.

DISCLOSURE OF THE INVENTION

The present invention is directed to a vertical contour correcting device which corrects vertical contour components of a video signal to enhance vertical contour of the video signal, which comprises:

a correlation detector for detecting correlation between a noise component contained in the video signal and the vertical contour components; and a quantity of correction varying unit for varying the quantity of correction of the vertical contour components on the basis of the correlation;

thereby enhancing the vertical contour without enhancing the noise.

As stated above, according to the first aspect, the quantity of correction is varied in accordance with correlation between noise component contained in an input video signal and vertical contour components to correct vertical contour in accordance with the magnitude of the noise component, thus reducing enhancement of the noise by the vertical contour correction without considerably deteriorating the effect of the entire contour correction.

According to a second aspect of the invention, in the first aspect, the correlation detector comprises, a vertical contour component extracting unit for extracting vertical contour components adjacent in horizontal direction from the video signal, and a horizontal correlation detector for detecting correlation between the detected vertical contour components adjacent in the horizontal direction.

As stated above, according to the second aspect of the invention, the quantity of correction is varied in accordance with correlation between horizontally adjacent vertical contour components extracted from an input video signal to correct the vertical contour components by detecting presence/absence of a noise component among or in the vicinity of the contour components, thus reducing enhancement of the noise caused by the vertical contour enhancement without considerably deteriorating the effect of the entire contour correction.

According to a third aspect of the invention, in the first aspect, the vertical contour correcting device further comprises a vertical contour correcting unit for adding the corrected vertical contour components to the video signal to generate a second video signal with enhanced vertical contour.

According to a fourth aspect of the invention, in the second aspect, the horizontal correlation detector comprises, a sign extracting unit for extracting signs of the vertical contour components adjacent in the horizontal direction, and a sign comparator for comparing the extracted signs, wherein the quantity of correction varying unit varies the quantity of correction when the signs of the vertical contour components adjacent in the horizontal direction are inverted.

As stated above, according to the fourth aspect of the invention, when a vertical contour component corrected in the opposite direction, due to noise, to the present video signal adjacent in the horizontal direction is extracted, the quantity of correction can be varied so as to reduce enhancement of the noise.

According to a fifth aspect of the invention, in the first aspect, the vertical contour component extracting unit further comprises a delayed video signal extracting unit for extracting a delayed video signal from the video signal by delay-adjusting the video signal, and wherein the vertical contour correcting device further comprises a vertical contour correcting unit for varying the video signal with the varied quantity of correction to generate a second video signal with enhanced vertical contour.

According to a sixth aspect of the invention, in the first aspect, the vertical contour correcting device further comprises a vertical contour component quantity checking unit for comparing the vertical contour component with a given threshold, wherein the vertical contour component quantity checking unit does not allow the quantity of correction varying unit to operate when the vertical contour component is smaller than the threshold.

As stated above, according to the sixth aspect of the invention, the quantity of correction varying unit is not operated when a vertical contour component inputted to the vertical contour component correlation detector is smaller than a given threshold, and therefore even if a vertical contour component corrected in the opposite direction, due to noise, to horizontally adjacent video signal is extracted, it is possible to know whether it is caused by noise or is a vertical contour component of the original video signal to set the most proper quantity of correction for the vertical contour.

According to a seventh aspect of the invention, in the fourth aspect, when the vertical contour component is smaller than the threshold, the vertical contour component quantity checking unit generates a control signal to stop operation of the quantity of correction varying unit.

An eighth aspect of the invention is directed to a vertical contour correcting device which corrects vertical contour components of a first video signal to generate a second video signal in which vertical contour of the video signal is enhanced, which comprises:

a correlation detector for detecting correlation between components adjacent in horizontal direction in the first video signal and the video signals with corrected vertical contour components; and a quantity of correction varying unit for varying the quantity of correction of the vertical contour components on the basis of the detected correlation.

As stated above, according to the eighth aspect of the invention, a vertical contour correcting device which enhances vertical contour components of a video signal is characterized by varying the quantity of correction in accordance with correlation between horizontally adjacent present video signals and video signals with corrected vertical contour components, wherein when the vertical contour correction causes the magnitude relation between video signals adjacent in the horizontal direction to differ from that before correction, the quantity of correction can be varied to keep the linearity of the video in the horizontal direction.

According to a ninth aspect of the present invention, a vertical contour correcting device which corrects vertical contour components of a video signal with a given quantity of correction to enhance vertical contour of the video signal comprises:

a vertical contour component extracting unit for extracting a delayed video signal by delay-adjusting the vertical contour components from the video signal and the video signal;

a correcting unit for varying the vertical contour components to generate a correction signal;

an adder for adding the correction signal and the delayed video signal to generate a vertical contour corrected video signal;

a comparator for comparing magnitude relation between delayed video signal components and magnitude relation in the vertical contour corrected video signals, the video signal components adjacent in horizontal direction extracted from the detected delayed video signal and the vertical contour corrected video signal being inputted thereto; and a controller for varying the quantity of correction of the correcting unit when the magnitude relation between the horizontally adjacent video signal components is inverse to the magnitude relation in the vertical contour corrected video signal, based on an output from the comparator.

As stated above, according to the ninth aspect of the invention, it comprises a controller for varying the quantity (K) of correction for the correcting unit when the magnitude relation between horizontally adjacent present video signals before correction is inverse to the magnitude relation between video signals after correction, and then the quantity of correction can be varied when the vertical contour correction causes the magnitude relation between horizontally adjacent video signals to differ from that before correction, thus keeping the linearity in the horizontal direction of the video.

According to a tenth aspect of the invention, a vertical contour correcting device which corrects vertical contour components of a video signal with a given quantity of correction to enhance vertical contour of the video signal comprises:

a vertical contour component extracting unit for generating a delayed video signal by delaying the vertical contour components from the video signal and the video signal;

a plurality of first delay units for sequentially delaying the vertical contour components to generate a plurality of delayed vertical contour component signals;

a minimum value detector connected to the plurality of first delay units for detecting a minimum value among the plurality of delayed vertical contour component signals; and a correcting unit which uses the minimum value among the delayed vertical contour component signals as the quantity of correction.

As stated above, according to the tenth aspect of the invention, the minimum value is detected from among vertical contour components extracted from an input video signal by using a plurality of delay units and a minimum value detector and the detected minimum value is used as a correction signal, which reduces enhancement of noise when a vertical contour component of the video signal is much larger than horizontally adjacent pixels due to an impulse type noise which is difficult to reduce with a horizontal low-pass filter.

According to an eleventh aspect of the invention, in the tenth aspect, the correcting unit comprises, a coring circuit for coring the minimum value of the delayed vertical contour component signals, a horizontal low-pass filter unit for applying horizontal low-pass filter to the cored minimum value of the delayed vertical contour component signals, a coefficient unit for multiplying the minimum value subjected to the horizontal low-pass filter by a given coefficient, and a limiter unit for limiting band of the minimum value multiplied by the coefficient, and wherein the vertical contour correcting device further comprises, a plurality of second delay units for sequentially delaying the delayed video signal to generate a second delayed video signal, and an adder for adding the second delayed video signal delayed video signal and the quantity of correction to generate a vertical contour corrected video signal.

As stated above, according to the eleventh aspect of the invention, a vertical contour correcting device having a unit which sequentially inputs extracted vertical contour components to circuits to extract a vertical contour correction signal and an adder for adding the vertical contour correction signal and a delay-adjusted present video signal comprises a group of a plurality of first delay units receiving the vertical contour components extracted by the extracting unit, a first minimum value detector receiving the vertical contour components outputted from the first delay unit group for outputting the minimum value thereof, and a group of a plurality of, two or more, second delay units for delay-adjusting the present signal, which can reduce enhancement of noise when an impulse type noise which is difficult to reduce with a horizontal low-pass filter causes a vertical contour component of the video signal to become much larger than horizontally adjacent pixels.

According to a twelfth aspect of the invention, in the eleventh aspect, the minimum value detector and the horizontal low-pass filter have equal horizontal delay times, and the plurality of second delay units have a delay time equal to a sum of the horizontal delay time in the minimum value detector and the horizontal delay time in the horizontal low-pass filter.

As stated above, according to the twelfth aspect of the invention, the delay time used to detect the minimum value is equal to the delay time in the horizontal low-pas filter, and then the horizontal direction line vertical contour component outputted from the minimum value detector becomes the same horizontal direction line vertical contour component as the original contour. As a result, it is possible to reduce extension of the vertical contour correction signal to video originally not corrected.

According to a thirteenth aspect of the invention, in the first aspect, the quantity of correction varying unit further comprises a coefficient multiplier for varying the quantity of correction by multiplying the quantity of correction by a coefficient having a given value, and wherein vertical contour enhancement of the video signal is varied with the quantity of correction varied with the coefficient to enhance only the vertical contour while suppressing enhancement of the noise.

As stated above, according to the thirteenth aspect of the invention, the quantity of correction is corrected with a coefficient, and then fine correction can be applied by devising the way of setting the coefficient.

According to a fourteenth aspect, in the thirteenth aspect, the coefficient is smaller than 1.

As stated above, according to the fourteenth aspect, the vertical contour enhancement processing in which the quantity of correction is set to be smaller than one prevents noise from being enhanced with the vertical contour.

According to a fifteenth aspect of the invention, in the fourteenth aspect, the correlation detector comprises, a vertical contour component extracting unit for extracting vertical contour components adjacent in horizontal direction from the video signal, and a horizontal correlation detector for detecting correlation between the detected horizontally adjacent vertical contour components, and wherein the quantity of correction varying unit multiplies the detected horizontally adjacent vertical contour components by coefficients having different given values.

As stated above, according to the fifteenth aspect of the invention, vertical contour components adjacent in the horizontal direction are multiplied by coefficients with different values so that correction can properly be applied in accordance with the correlation between the vertical contour components, which is especially effective to prevent impulse noise.

According to a sixteenth aspect of the invention, in the fourteenth aspect, the correlation detector comprises, a vertical contour component extracting unit for extracting vertical contour components adjacent in horizontal direction from the video signal, and a horizontal correlation detector for detecting correlation between the detected horizontally adjacent vertical contour components, and wherein the quantity of correction varying unit multiplies the detected horizontally adjacent vertical contour components by a coefficient having the same given value.

As stated above, according to the fifteenth aspect of the invention, horizontally adjacent vertical contour components are multiplied by the same coefficient to apply uniform correction, which is especially effective for prevention of step noise.

According to a seventeenth aspect of the invention, a vertical contour correcting method which corrects vertical contour components of a video signal to enhance vertical contour of the video signal comprises:

a correlation detecting step of detecting correlation between a noise component contained in the video signal and the detected vertical contour components; and a quantity of correction varying step of varying the quantity of correction of the vertical contour components on the basis of the correlation;

thereby enhancing the vertical contour without enhancing the noise.

As stated above, according to the seventeenth aspect of the invention, the quantity of correction is varied in accordance with correlation between noise component contained in an input video signal and vertical contour components to correct vertical contour in accordance with the magnitude of the noise component, thus reducing enhancement of the noise caused by the vertical contour correction without considerably deteriorating the effect of the entire contour correction.

According to an eighteenth aspect of the invention, in the seventeenth aspect, the correlation detecting step comprises, a vertical contour component detecting step of detecting vertical contour components adjacent in horizontal direction from the video signal, and a horizontal correlation detecting step of detecting correlation between the detected vertical contour components adjacent in the horizontal direction.

As stated above, according to the eighteenth aspect of the invention, the quantity of correction is varied in accordance with correlation between horizontally adjacent vertical contour components extracted from an input video signal to correct the vertical contour components by detecting presence/absence of a noise component among or in the vicinity of the contour components, thus reducing enhancement of the noise caused by the vertical contour enhancement without considerably deteriorating the effect of the entire contour correction.

According to a nineteenth aspect of the invention, in the seventeenth aspect, the vertical contour correcting method further comprises a vertical contour correcting step of adding the corrected vertical contour components to the video signal to generate a second video signal with enhanced vertical contour.

According to a twentieth aspect of the invention, in the eighteenth aspect, the horizontal correlation detecting step comprises, a sign extracting step of extracting signs of the vertical contour components adjacent in the horizontal direction, and a sign comparing step of comparing the extracted signs, wherein the quantity of correction varying unit varies the quantity of correction when the signs of the vertical contour components adjacent in the horizontal direction are inverted.

As stated above, according to the twentieth aspect of the invention, when a vertical contour component corrected in the opposite direction, due to noise, to the present video signal adjacent in the horizontal direction is extracted, the quantity of correction can be varied so as to reduce enhancement of the noise.

According to a twenty-first aspect of the invention, in the seventeenth aspect, the vertical contour component extracting step further comprises a delayed video signal extracting step of extracting a delayed video signal from the video signal by delay-adjusting the video signal, and wherein the vertical contour correcting method further comprises a vertical contour correcting unit for varying said video signal with the varied quantity of correction to generate a second video signal with enhanced vertical contour.

According to a twenty-second aspect of the invention, in the seventeenth aspect, the vertical contour correcting method further comprises a vertical contour component quantity checking step of comparing the vertical contour component with a given threshold, wherein the vertical contour component quantity checking step does not allow the quantity of correction varying step to be executed when the vertical contour component is smaller than the threshold.

As stated above, according to the twenty-second aspect of the invention, the quantity of correction varying unit is not operated when a vertical contour component inputted to the vertical contour component correlation detector is smaller than a given threshold, and therefore even if a vertical contour component corrected in the opposite direction, due to noise, to horizontally adjacent video signal is extracted, it is possible to know whether it is caused by noise or is a vertical contour component of the original video signal to set the most proper quantity of correction for the vertical contour.

According to a twenty-third aspect of the invention, in the twentieth aspect, when the vertical contour component is smaller than the threshold, the vertical contour component quantity checking step generates a control signal to stop the quantity of correction varying step.

According to a twenty-fourth aspect of the invention, in a vertical contour correcting method for enhancing vertical contour components of a video signal, the quantity of correction for enhancing the vertical contour components is varied on the basis of correlation between present video signals adjacent in horizontal direction and video signals with corrected vertical contour components.

As stated above, according to the twenty-fourth aspect of the invention, a vertical contour correcting device which enhances vertical contour components of a video signal is characterized by varying the quantity of correction in accordance with correlation between horizontally adjacent present video signals and the video signals with corrected vertical contour components, wherein when the vertical contour correction causes the magnitude relation between video signals adjacent in the horizontal direction to differ from that before correction, the quantity of correction can be varied to keep the linearity of the video in the horizontal direction.

According to a twenty-fifth aspect of the invention, a vertical contour correcting method which corrects vertical contour components of a video signal with a given quantity of correction to enhance vertical contour of the video signal comprises:

a vertical contour component extracting step of extracting a delayed video signal by delay-adjusting the vertical contour components from the video signal and the video signal;

a correcting step of varying the vertical contour components to generate a correction signal;

an adding step of adding the correction signal and the delayed video signal to generate a vertical contour corrected video signal;

a step of inputting video signal components adjacent in horizontal direction extracted from the detected delayed video signal and the vertical contour corrected video signal, a comparing step of comparing magnitude relation between the delayed video signal components and magnitude relation in the vertical contour corrected video signal; and a control step of varying the quantity of correction in the correcting step when the magnitude relation between the horizontally adjacent video signal components is inverse to the magnitude relation in the vertical contour corrected video signal, based on an output from the comparing step.

As stated above, according to the twenty-fifth aspect of the invention, it comprises a controller for varying the quantity of correction by the correcting unit when the magnitude relation between horizontally adjacent present video signals before correction is inverse to the magnitude relation between video signals after correction, and then the quantity of correction can be varied when the vertical contour correction causes the magnitude relation between horizontally adjacent video signals to differ from that before correction, thus keeping the linearity in the horizontal direction of the video.

According to a twenty-sixth aspect, a vertical contour correcting method which corrects vertical contour components of a video signal with a given quantity of correction to enhance vertical contour of the video signal comprises:

a vertical contour component extracting step of generating a delayed video signal by delaying the vertical contour components from the video signal and the video signal;

a first delay step of sequentially delaying the vertical contour components to generate a plurality of delayed vertical contour component signals;

a minimum value detecting step connected to the plurality of first delay units for detecting a minimum value among the plurality of delayed vertical contour component signals; and a correcting step which uses the detected minimum value among the delayed vertical contour component signals as the quantity of correction.

As stated above, according to the twenty-sixth aspect of the invention, the minimum value is detected from among vertical contour components extracted from an input video signal by using a plurality of delay units and a minimum value detector and the detected minimum value is used as a correction signal, which reduces enhancement of noise when a vertical contour component of the video signal is much larger than horizontally adjacent pixels due to an impulse type noise which is difficult to reduce with a horizontal low-pass filter.

According to a twenty-seventh aspect, in the twenty-sixth aspect, the correcting step comprises, a coring step of coring the minimum value of the delayed vertical contour component signals, a horizontal low-pass filter step of applying horizontal low-pass filter to the cored minimum value of the delayed vertical contour component signals, a coefficient step of multiplying the minimum value subjected to the horizontal low-pass filter by a given coefficient, and a limit step of limiting band of the minimum value multiplied by the coefficient, and wherein the vertical contour correcting method further comprises, a second delay step of sequentially delaying the delayed video signal to generate a second delayed video signal, and an adding step of adding the second delayed video signal delayed video signal and the quantity of correction to generate a vertical contour corrected video signal.

As stated above, according to the twenty-seventh aspect of the invention, a vertical contour correcting device having a unit which sequentially inputs extracted vertical contour components to circuits to extract a vertical contour correction signal and an adder for adding the vertical contour correction signal and a delay-adjusted present video signal comprises a first delay step receiving the vertical contour components extracted by the extracting unit, a first minimum value detector receiving the vertical contour components outputted from the first delay step for outputting the minimum value thereof, and a group of a plurality of, two or more, second delay units for delay-adjusting the present signal, which can reduce enhancement of noise when an impulse type noise which is difficult to reduce with a horizontal low-pass filter causes a vertical contour component of the video signal to become much larger than horizontally adjacent pixels.

According to a twenty-eighth aspect of the invention, in the twenty-seventh aspect, the minimum value detecting step and the horizontal low-pass filter step have equal horizontal delay times, and the plurality of second delay steps have a delay time equal to a sum of the horizontal delay time in the minimum value detecting step and the horizontal delay time in the horizontal low-pass filter step.

As stated above, according to the twenty-eighth aspect, the delay time used to detect the minimum value is equal to the delay time in the horizontal low-pas filter step, and then the horizontal direction line vertical contour component outputted from the minimum value detector becomes the same horizontal direction line vertical contour component as the original contour. As a result, it is possible to suppress extension of the vertical contour correction signal to video originally not corrected.

According to a twenty-ninth aspect of the invention, in the seventeenth aspect, the quantity of correction varying step further comprises a coefficient multiplying step of varying the quantity of correction by multiplying the quantity of correction by a coefficient having a given value, and wherein vertical contour enhancement of the video signal is varied with the quantity of correction varied with the coefficient to enhance only the vertical contour while suppressing enhancement of the noise.

As stated above, according to the twenty-ninth aspect of the invention, the quantity of correction is corrected with a coefficient, and then fine correction can be applied by devising the way of setting the coefficient.

According to a thirtieth aspect of the invention, in the twenty-ninth aspect, the coefficient is smaller than 1.

As stated above, according to the thirtieth aspect of the invention, the vertical contour enhancement processing in which the quantity of correction is set to be smaller than one prevents noise from being enhanced with the vertical contour. According According to a thirty-first aspect of the invention, in the thirtieth aspect, the correlation detecting step comprises, a vertical contour component extracting step of extracting vertical contour components adjacent in horizontal direction from the video signal, and a horizontal correlation detecting step of detecting correlation between the detected horizontally adjacent vertical contour components, and wherein the quantity of correction varying step multiplies the detected horizontally adjacent vertical contour components by coefficients having different given values.

As stated above, according to the thirty-first aspect of the invention, vertical contour components adjacent in the horizontal direction are multiplied by coefficients with different values so that correction can properly be applied in accordance with correlation between the vertical contour components, which is especially effective to prevent impulse noise.

According to a thirty-second aspect of the invention, in the thirtieth aspect, the correlation detecting step comprises, a vertical contour component extracting step of extracting vertical contour components adjacent in horizontal direction from the video signal, and a horizontal correlation detecting step of detecting correlation between the detected horizontally adjacent vertical contour components, and wherein the quantity of correction varying step multiplies the detected horizontally adjacent vertical contour components by a coefficient having the same given value.

As stated above, according to the thirty-second aspect of the invention, horizontally adjacent vertical contour components are multiplied by the same coefficient to apply uniform correction, which is especially effective for prevention of step noise.

BEST MODE FOR CARRYING OUT THE INVENTION

Figure 1:
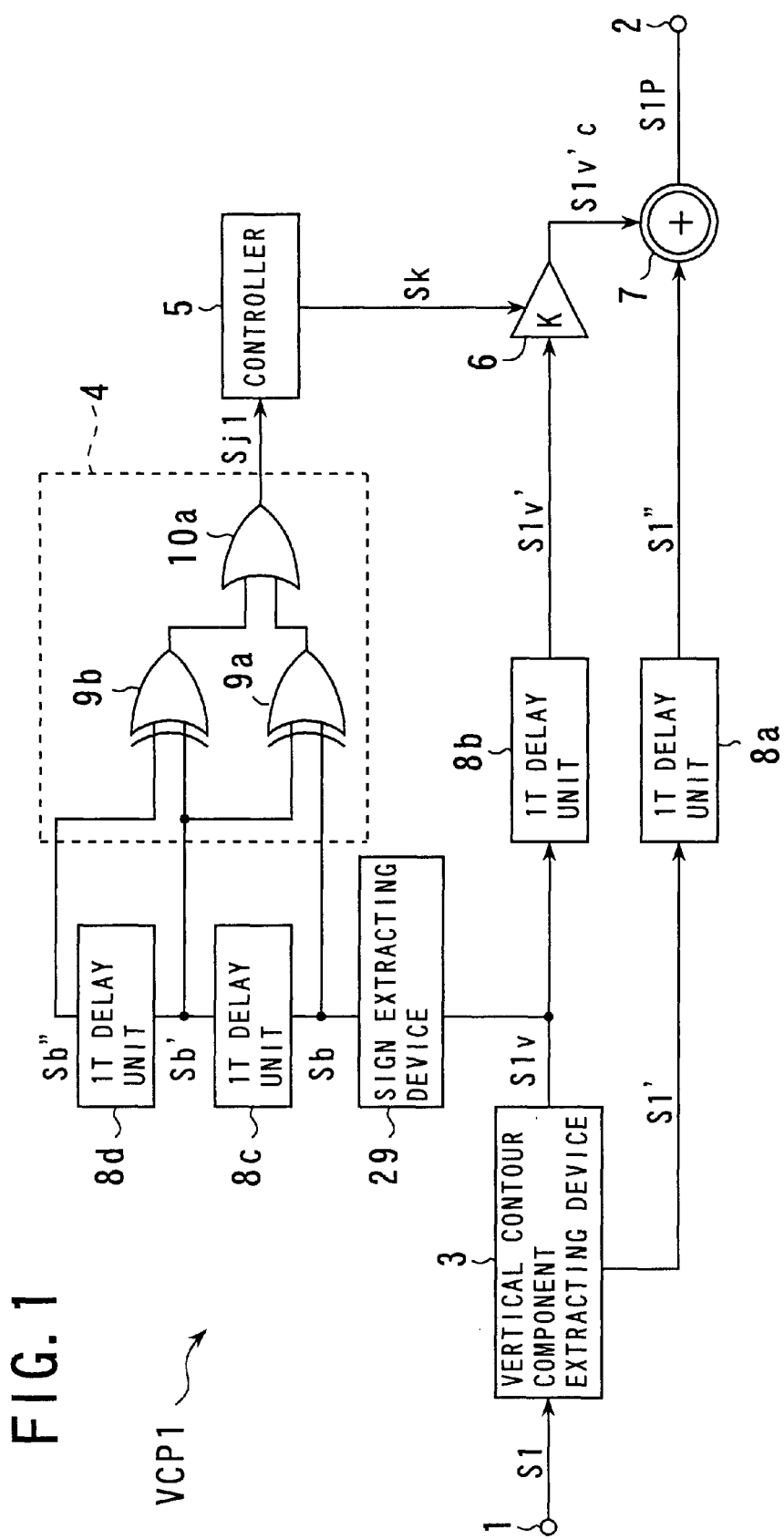
FIG. 1 is a block diagram showing the structure of a vertical contour correcting device according to a first embodiment of the present invention.

Embodiments of the present invention will now be described referring to the accompanying drawings. In the drawings, the same components are shown by the same reference characters and, for simplification, they are not described repeatedly. A first embodiment will be described referring to FIGS. 1, 2, 3, 4, 5, 6, 7, 8, 9, and 10, a second embodiment referring to FIG. 11, a third embodiment referring to FIG. 12, and a fourth embodiment referring to FIGS. 13, 14, 15, 16, 17, and 18.

(First Embodiment)

First, the structure of a vertical contour correcting device VCP1 of a first embodiment of the present invention will be described referring to FIG. 1 and then its operation will be described referring to FIGS. 2, 3, 4, 5, 6, 7, 8, 9, and 10.

As shown in FIG. 1, the vertical contour correcting device VCP1 in this embodiment has an input port 1, a vertical contour component extracting device 3, a comparator device 4, a controller 5, a coefficient unit 6, an adder 7, an output port 2, a first 1T delay unit 8a, a second 1T delay unit 8b, a third 1T delay unit 8c, a fourth 1T delay unit 8d, and a sign extracting device 29. 1T stands for one horizontal sampling time.

Figure 19:
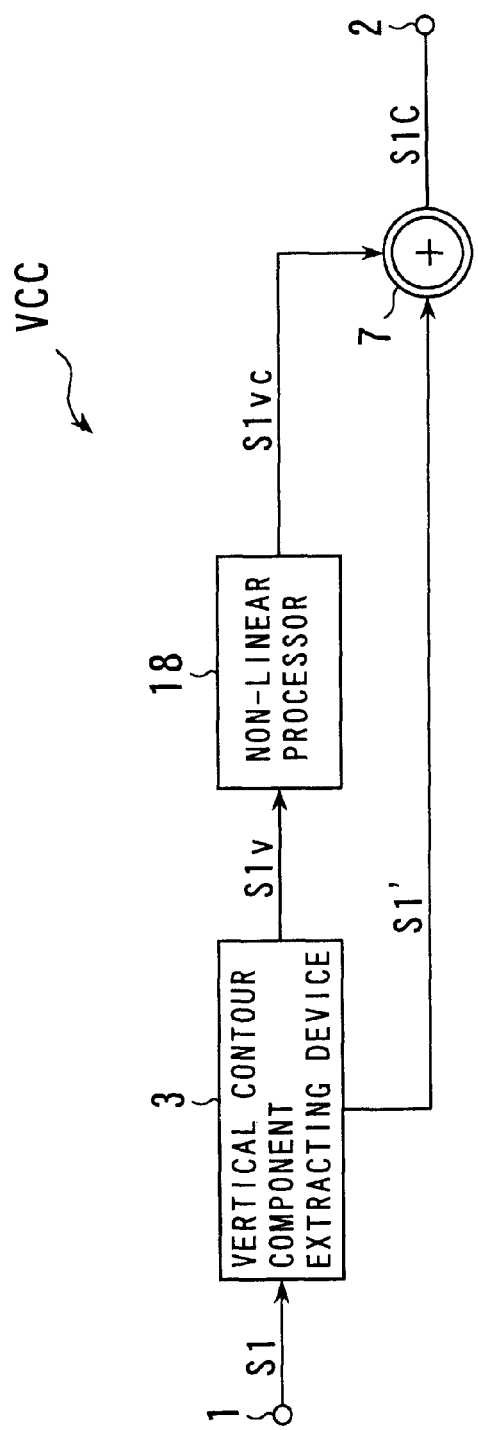
FIG. 19 is a block diagram showing the structure of a conventional vertical contour correcting device.
Figure 20:
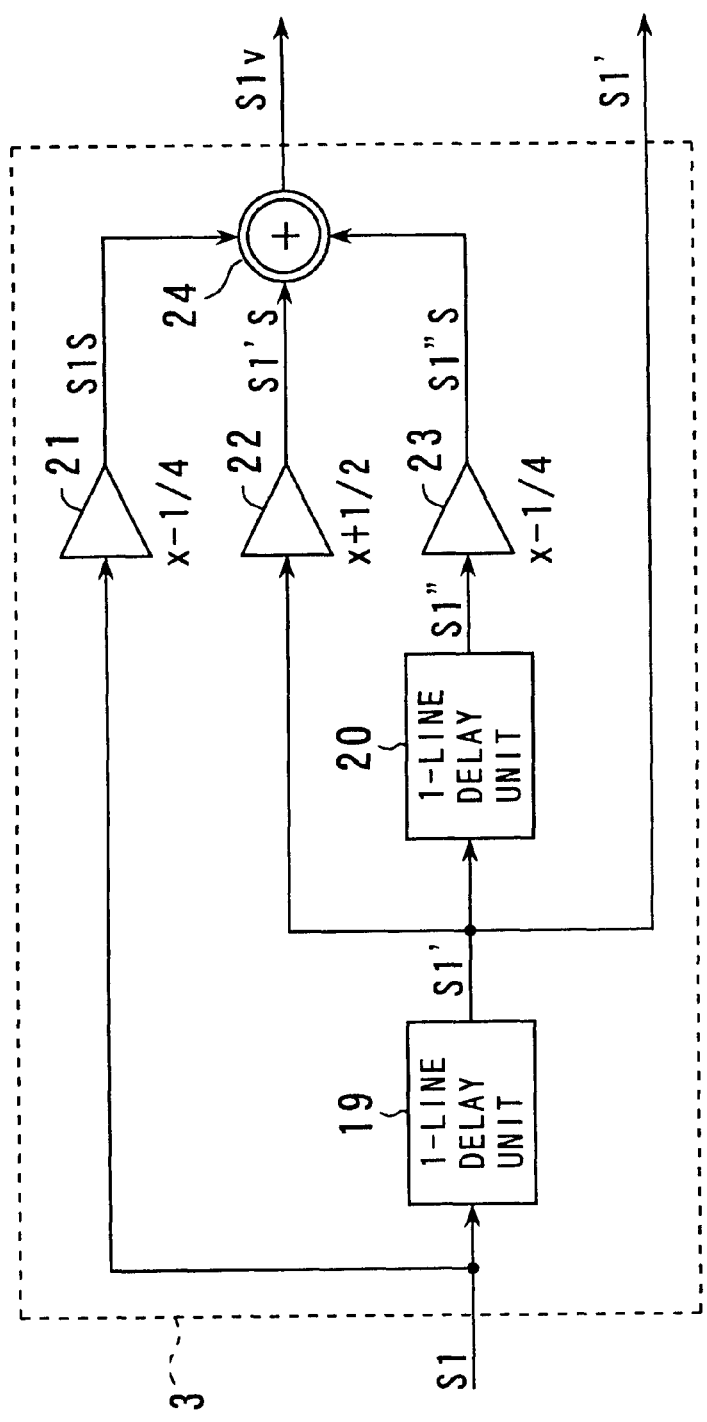
FIG. 20 is a block diagram showing the structure of the vertical contour component extracting device shown in FIG. 19.
Figure 21:
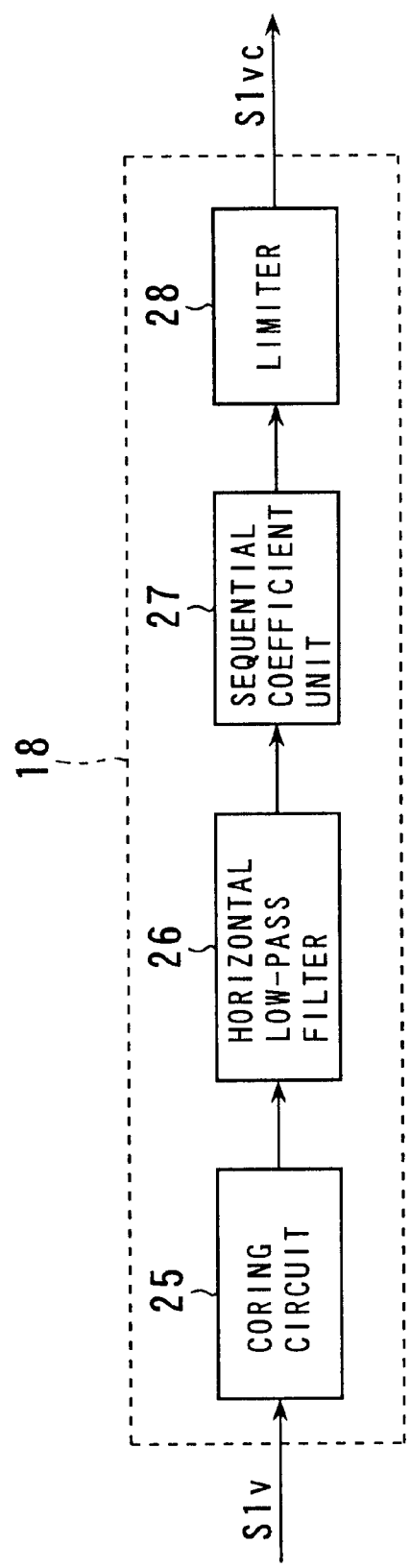
FIG. 21 is a block diagram showing the structure of the non-linear processor shown in FIG. 19.
Figure 22:
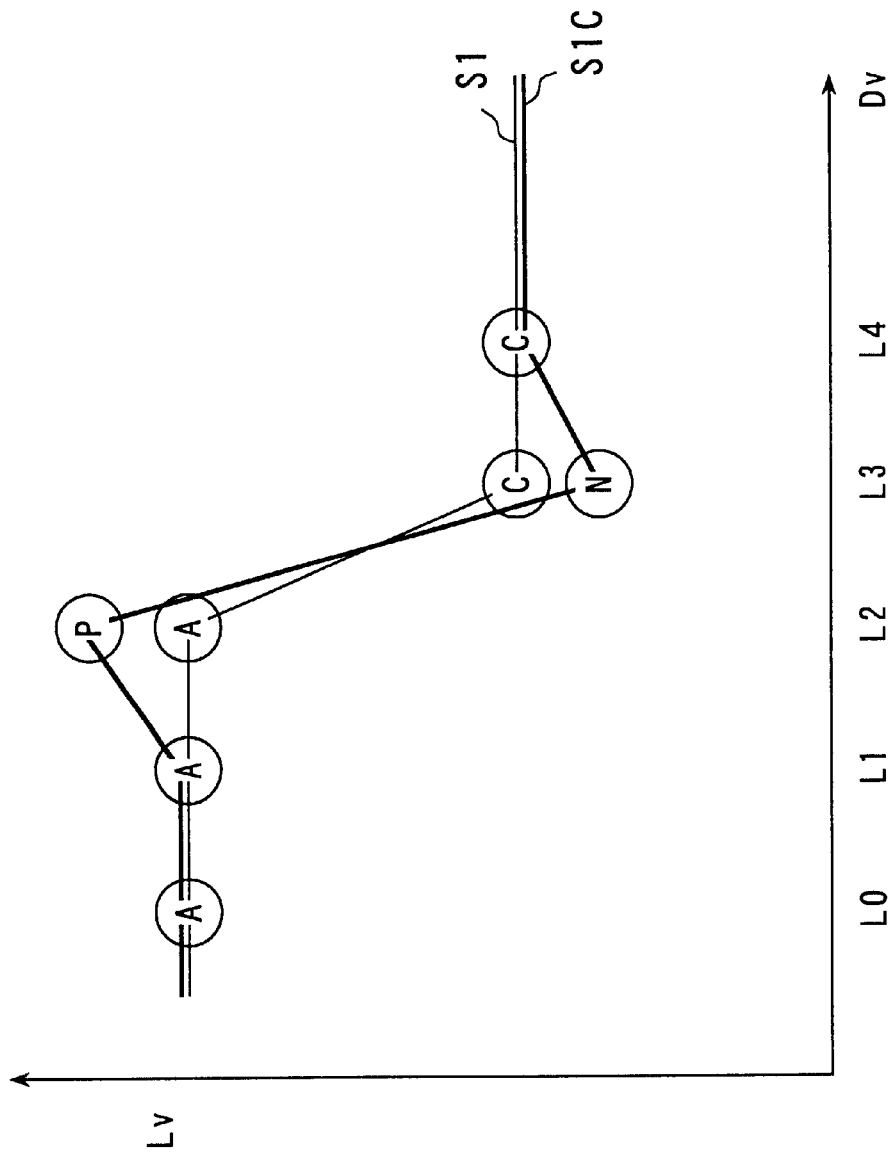
FIG. 22 is a diagram used to explain operation of the conventional vertical contour correcting device shown in FIG. 19.
Figure 23:
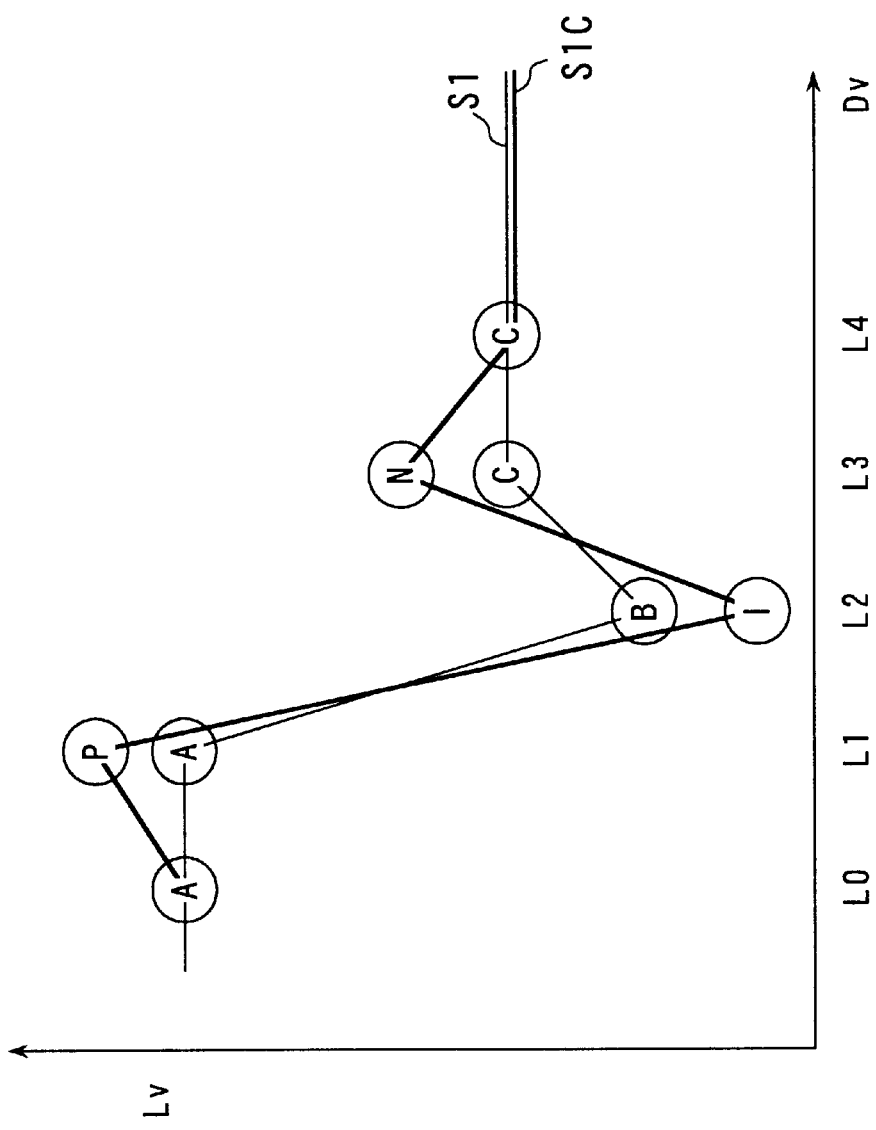
FIG. 23 is a diagram used to explain operation of the conventional vertical contour correcting device shown in FIG. 19.

The input port 1, vertical contour component extracting device 3, output port 2, adder 7, and output port 2 are the same as those already described for the conventional vertical contour correcting device VCC referring to FIGS. 19 and 20 and they are not described again here.

The first 1T delay unit 8a is connected to the vertical contour component extracting device 3 and delays the coming primary delayed digital video signal S1' for 1T to generate a secondary delayed digital video signal S1". The second 1T delay unit 8b and the sign extracting device 29 are both connected to the vertical contour component extracting device 3 to receive input of the vertical contour component signal S1v.

The second IT delay unit 8b delays the coming vertical contour component signal S1v for 1T to generate a primary delayed vertical contour component signal S1v'.

The sign extracting device 29 extracts the sign of the input vertical contour component signal S1v and generates a sign signal Sb indicating whether the sign is plus or minus. That is to say, the sign signal Sb is a binary signal which is zero when the vertical contour component signal S1v is plus and which is one when it is minus.

The third 1T delay unit 8c is connected to the sign extracting device 29 and delays the input sign signal Sb for 1T to generate a primary delayed sign signal Sb'.

The fourth 1T delay unit 8d is connected to the third 1T delay unit 8c and delays the input primary delayed Sign signal Sb' for 1T to generate a secondary delayed sign signal Sb". That is to say, the sign extracting device 29, third 1T delay unit 8c, and fourth 1T delay unit 8d extract three signs successive in the horizontal direction (Sb, Sb', and Sb). In this sense, the 1T delay unit 8c and the 1T delay unit 8d are one horizontal sampling time delay units.

The comparator device 4 includes a first exclusive OR element 9a, a second exclusive OR element 9b, and an OR element 10a. The exclusive OR element 9a has its one input terminal connected to the sign extracting device 29 to receive input of the sign signal Sb and its other input terminal connected to the first 1T delay unit 8c to receive input of the primary delayed sign signal Sb'. The exclusive OR element 9a outputs one when only one of the sign signal Sb and the primary delayed sign signal Sb' is one (when the sign is minus) and outputs zero in other states.

The second exclusive OR element 9b has its one input terminal connected to the fourth 1T delay unit 8d to receive input of the secondary delayed sign signal Sb" and its other input terminal connected to the third 1T delay unit 8c to receive input of the primary delayed sign signal Sb'. The exclusive OR element 9b outputs one when only one of the secondary delayed sign signal Sb" and the primary delayed sign signal Sb' is one (when the sign is minus) and outputs zero in other states.

The OR element 10a has its one input terminal connected to the output of the exclusive OR element 9a and its other input terminal connected to the output of the second exclusive OR element 9b. The OR element 10a outputs one when the output from the first exclusive OR element 9a or the output of the second exclusive OR element 9b is one and outputs zero in other states. That is to say, the output from the OR element 10a is one when only one of the horizontally successive three signs (Sb, Sb', and Sb") extracted from the vertical contour component signal S1v is plus, or when only two of the three signs (Sb, Sb', and Sb") are plus. That is to say, when the signs of the horizontally adjacent vertical contour components are inverted, it determines that there is an impulse noise at the boundary point of addition and subtraction to the primary delayed digital video signal S1' and outputs a decision signal Sj1 having the value of one.

The controller 5 is connected to the output terminal of the OR element 10a in the comparator device 4 to receive input of the decision signal Sj1. Then, on the basis of the decision signal Sj1, it determines the value of a coefficient K for the coefficient unit 6 and generates a coefficient setting signal SK.

The coefficient unit 6 is connected to the controller 5 and the second 1T delay unit 8b to receive input of the coefficient setting signal SK and the primary delayed vertical contour component signal S1v', respectively. The coefficient unit 6 then multiplies the primary delayed vertical contour component signal S1v' by the coefficient K set by the coefficient setting signal SK to generate a primary delayed vertical contour correction signal S1v'c.

The adder 7 is connected to the coefficient unit 6 and the first 1T delay unit 8a to receive input of the primary delayed vertical contour correction signal S1v'c and the secondary digital video signal S1", respectively. The adder 7 then adds the primary delayed vertical contour correction signal S1v'c and the secondary digital video signal S1" to generate a vertical contour corrected video signal S1P or a video signal with corrected vertical contour components.

In the adder 7, when the primary delayed vertical contour component signal S1v' as a contour component has a positive value, it is added to the secondary digital video signal S1", and when it has a negative value, it is subtracted. Signs of the vertical contour component signal S1v are sequentially inputted to the sign extracting device 29 and the one horizontal sampling time delay units 8c and 8d, and three signs (Sb, Sc', Sb") successive in the horizontal direction are thus extracted. The extracted signs are inputted to the first comparator device 4. The time when the signs of the horizontally adjacent vertical contour components invert is determined as a boundary of addition or subtraction to the primary delayed digital video signal S1', and then the decision signal Sj1 is inputted to the controller 5. On the basis of the decision signal Sj1, the controller 5 sets the coefficient K for the coefficient unit 6 to reduce correction to the primary delayed digital video signal S1' (the secondary digital video signal S1") for which the signs of the vertical contour components are inverted.

The vertical contour correcting operation by the above-described vertical contour correcting device VCP1 will be described in more detail. Usually, the primary delayed vertical contour component signal S1v' unchanged is added to the secondary digital video signal S1" to generate the vertical contour corrected video signal S1P in which vertical contour of the digital video signal S1 is enhanced. However, when a noise component like an impulse noise, which the signal level suddenly and largely varies, exists among or in the vicinity of the vertical contour components, this noise component is also enhanced together with the vertical contour components. As a result, as has been described referring to FIGS. 19 to 23, the image quality of the primary delayed vertical contour component signal S1v' with corrected vertical contour is considerably damaged.

Accordingly, in this embodiment, three successive signs in the horizontal direction in the vertical contour component signal S1v from the input digital video signal S1 are extracted by using the vertical contour component extracting device 3, sign extracting device 29, third 1T delay unit 8c, and fourth 1T delay unit 8d. Next, by using the comparator 4, the extracted three signs are checked to determine whether noise component exists among or in the vicinity of the vertical contour components to generate the decision signal Sj1.

On the basis of the decision signal Sj1, the controller 5 varies the primary delayed vertical contour component signal S1v', or a first vertical contour correction value to be added to the secondary digital video signal S1", in order to enhance the vertical contour components of the secondary digital video signal S1", and then the primary delayed vertical contour correction signal S1v'c as a second vertical contour correction value is thus generated.

That is to say, when the decision signal Sj1 is one, a noise component is contained among or in the vicinity of the vertical contour components of the digital video signal S1. Then it is necessary to suppress effect of the vertical contour enhancement of the noise component. Accordingly the vertical contour component signal S1v', which is added to the secondary digital video signal S1" to generate the vertical contour corrected video signal S1P in which the vertical contour of the digital video signal S1 is enhanced, is multiplied by the coefficient K (K<1). This coefficient is a correction coefficient for vertical contour enhancement, which is arbitrarily determined in the range of K<1 in accordance with the level of the noise component contained in the digital video signal S1 and in consideration of the reproduced image quality of the vertical contour corrected video signal S1P.

However, it is preferably determined in the range of $0 \leq K < 1$. Estimations of the vertical contour enhancement effect and noise suppression effect in the vertical contour corrected video signal S1P depend not only on the value of the vertical contour enhancement correction efficient K but also on electric characteristics of the reproducing system and observers. Accordingly it is practical to experimentally determine the vertical contour enhancement correction coefficient K in consideration of estimations of the reproducing system and observers.

The operation of the vertical contour correcting device VCP1 will now be described referring to FIGS. 2, 3, 4, 5, 6, 7, 8, 9 and 10.

Figure 2:
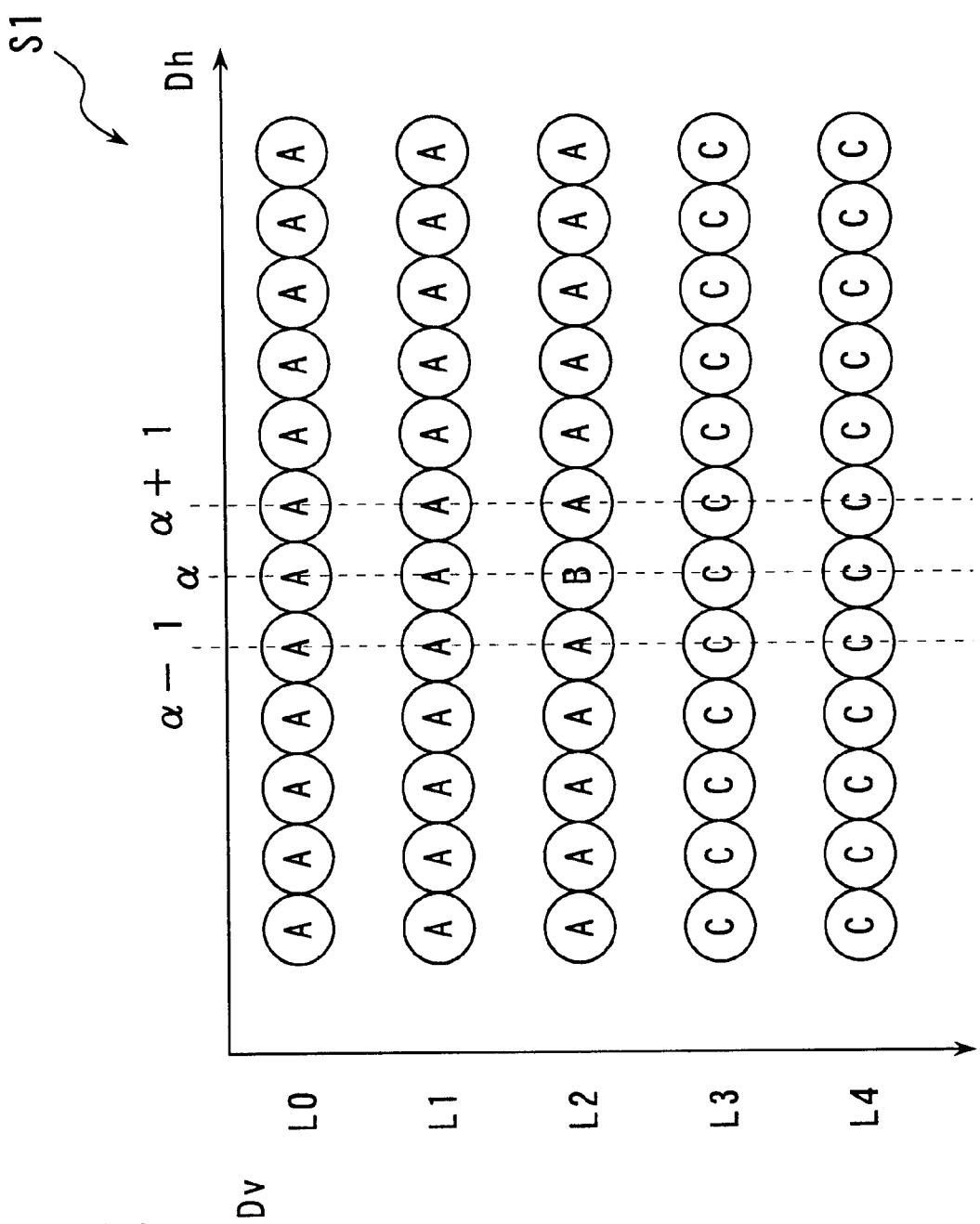
FIG. 2 is a diagram used to explain operation of the vertical contour correcting device of the first embodiment shown in FIG. 1.
Figure 3:
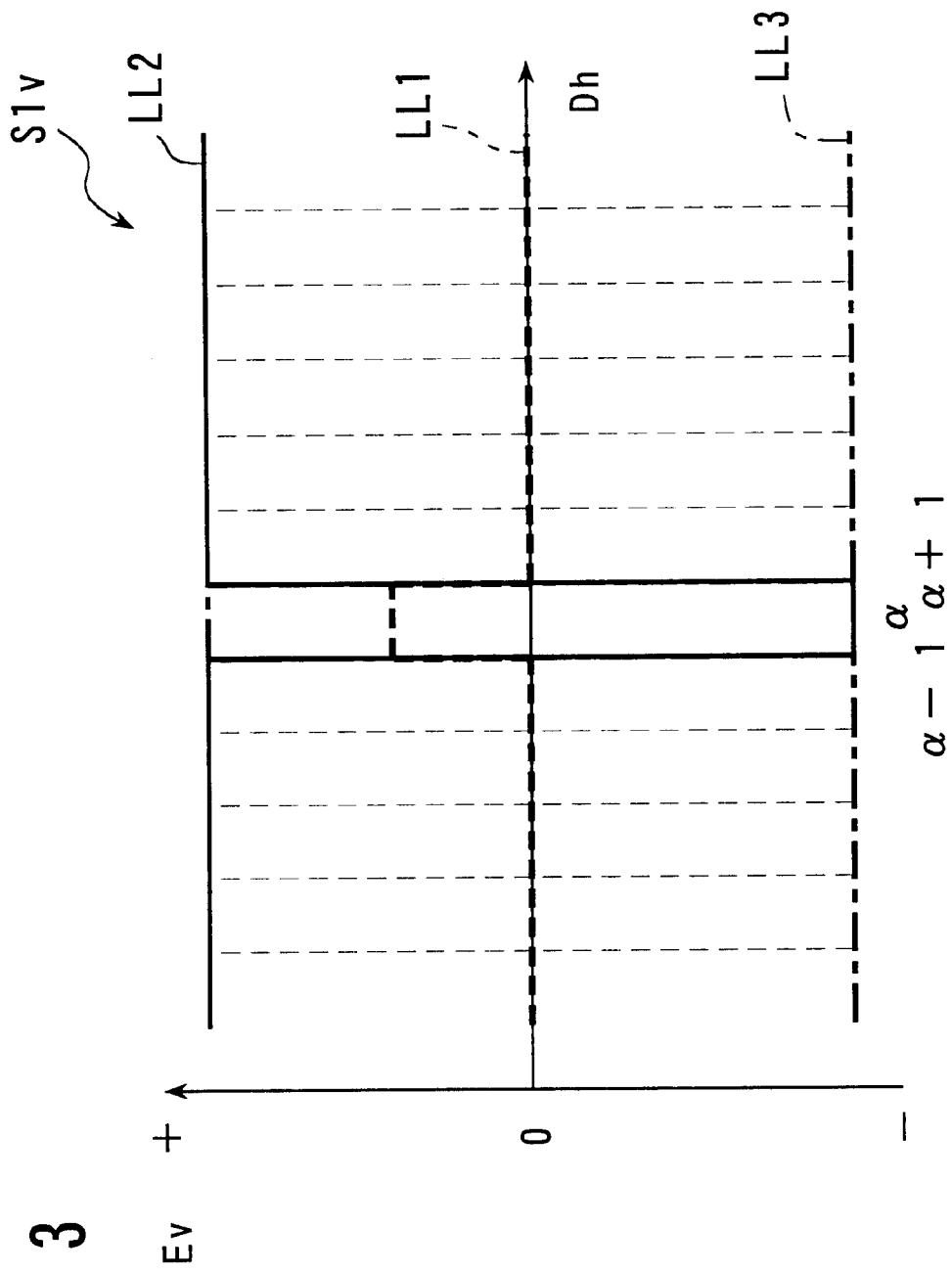
FIG. 3 is a diagram used to explain operation of the vertical contour correcting device of the first embodiment shown in FIG. 1.

FIG. 2 shows an image represented by the digital video signal S1. In FIG. 2, the ordinate shows the vertical scanning line direction Dv in the image, and the abscissa shows the horizontal scanning line direction Dh. In this image, ○ indicates a pixel representing the image. FIG. 2 shows an example in which the digital video signal S1 is represented by pixels PA, PB and PC at three different levels.

That is to say, they are first-level pixels PA indicated by ○ containing A, second-level pixels PB indicated by ○ containing B, and third-level pixels PC indicated by ○ containing C. All pixels on the horizontal line L0 and line L1 and the pixels on the horizontal line L2 except the pixel on the vertical line α are the first-level pixels PA. The pixel on the vertical line α on the horizontal line L2 is the second-level pixel PB. All pixels on the horizontal lines L3 and L4 are the third-level pixels PC. When the levels of the pixels PA, PB, and PC are respectively represented as Lpa, Lpb, and Lpc, they are in the relation Lpa>Lpc>Lpb. That is to say, in this case, the pixel PB on the vertical line α and the horizontal line L2 is an impulse noise.

Figure 4:
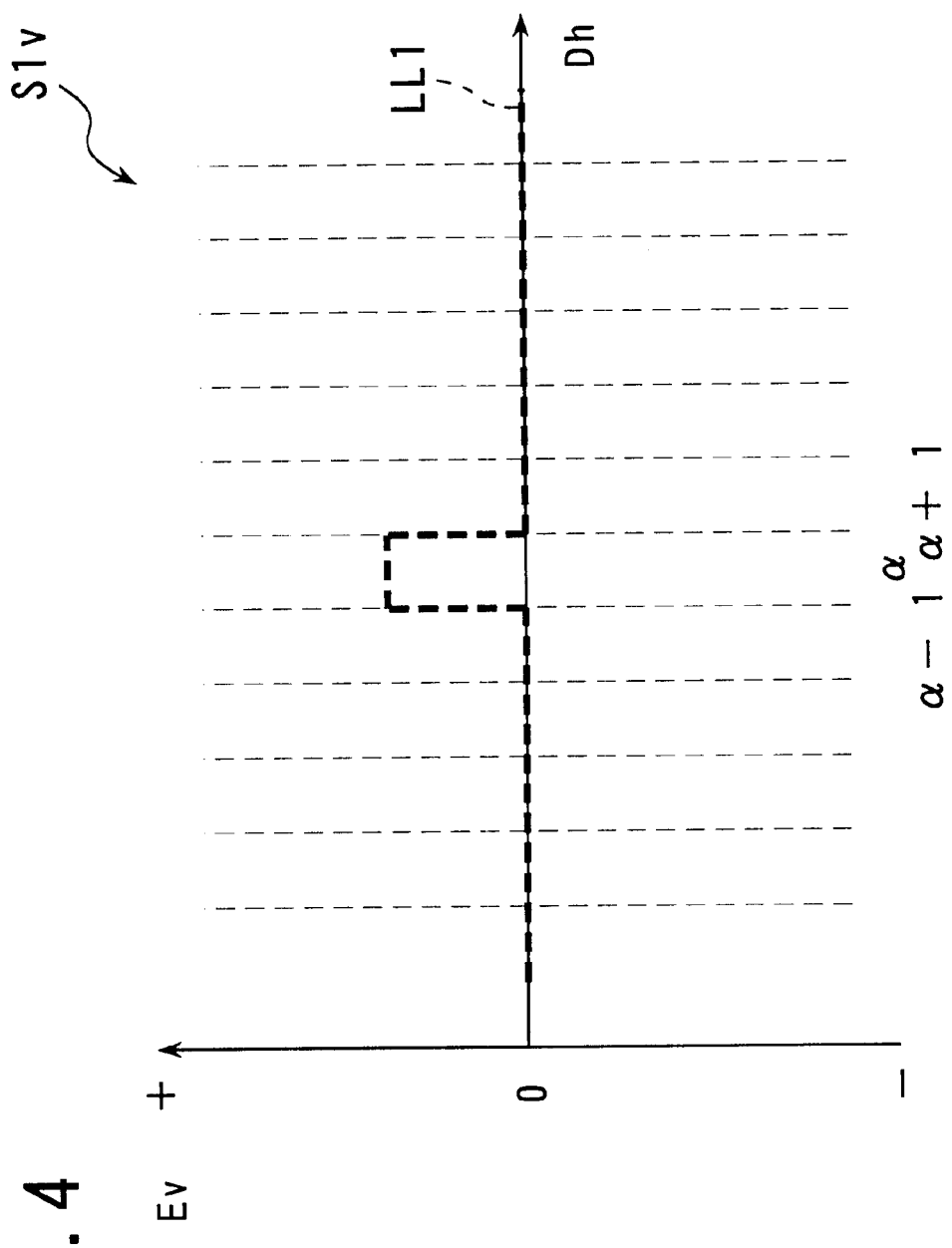
FIG. 4 is a diagram used to explain operation of the vertical contour correcting device of the first embodiment shown in FIG. 1.
Figure 5:
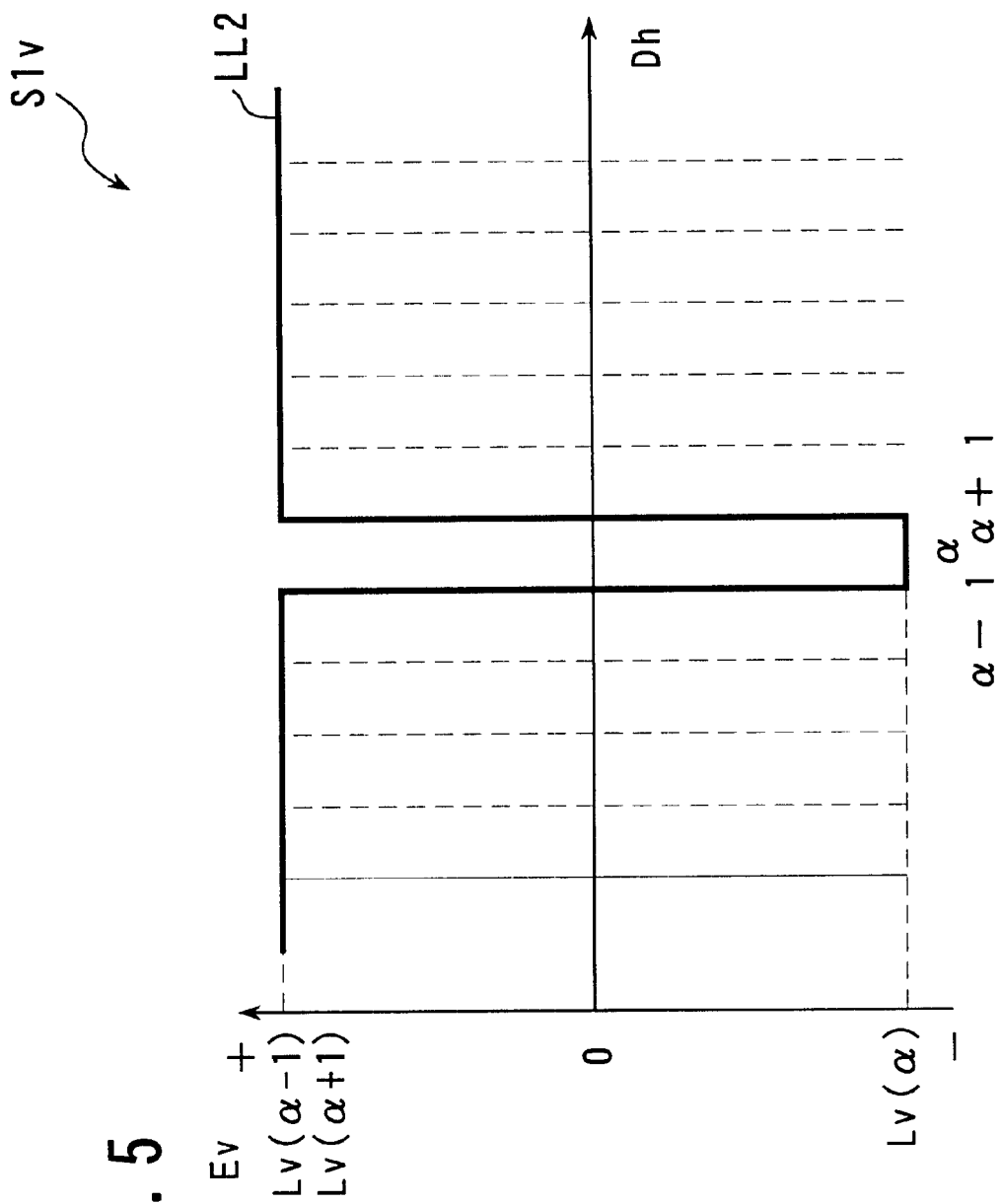
FIG. 5 is a diagram used to explain operation of the vertical contour correcting device of the first embodiment shown in FIG. 1.
Figure 6:
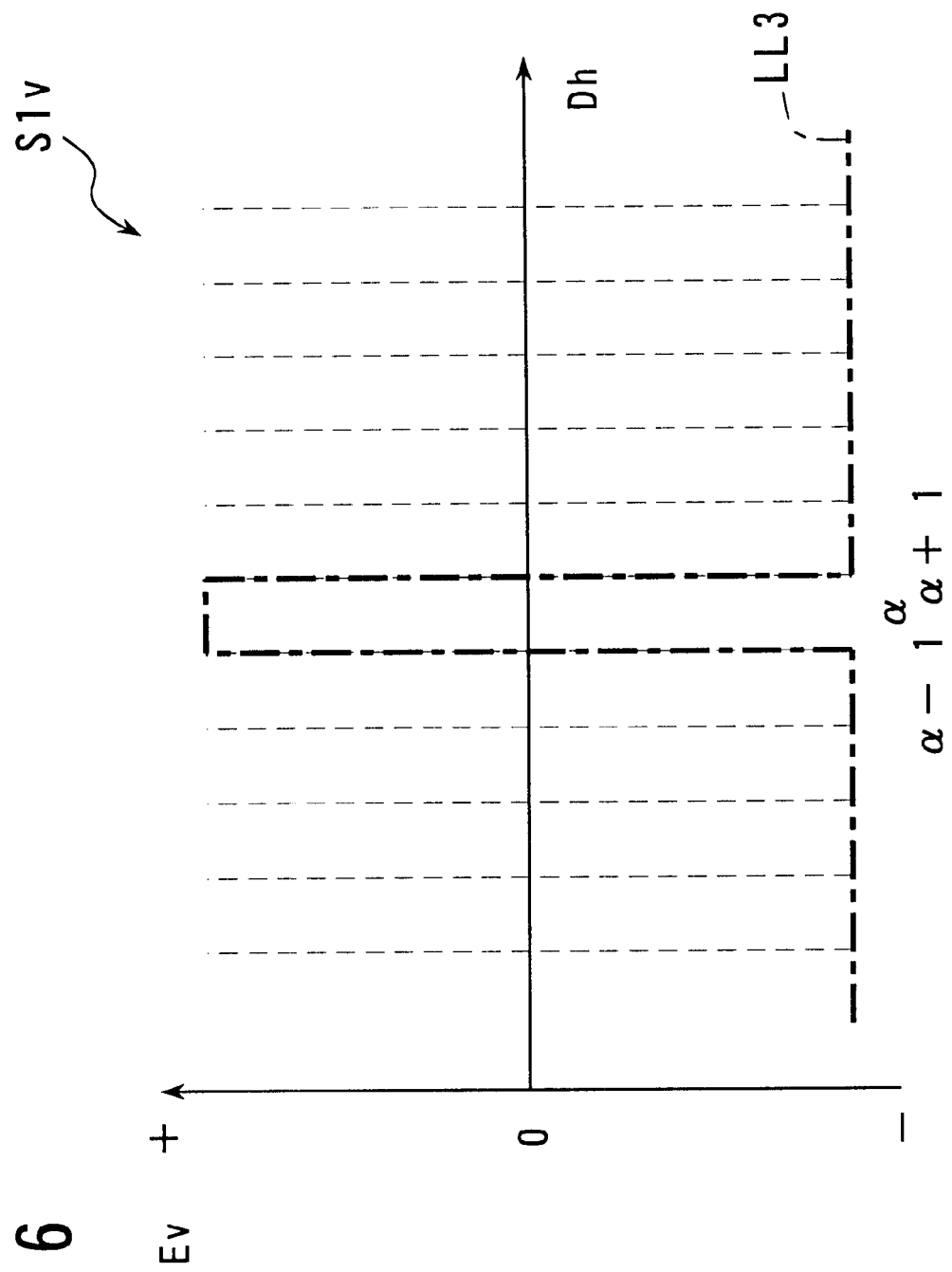
FIG. 6 is a diagram used to explain operation of the vertical contour correcting device of the first embodiment shown in FIG. 1.

Next, FIGS. 3, 4, 5, and 6 show the vertical contour component signal S1v or the output from the vertical contour component extracting device 3. In these diagrams, the ordinate shows the level Ev of the vertical contour components and the abscissa shows the horizontal line direction Dh. The vertical contour component level Ev shows difference in level between adjacent pixels. The broken line LL1 shows the vertical contour components on the vertical line L1, the solid line LL2 shows the vertical contour components on the vertical line L2, and the one-dot chain line LL3 shows the vertical contour components on the vertical line L3. Since this diagram is complicated with the three lines LL1, LL2 and LL3 overlapped, FIG. 4 shows the broken line LL1, FIG. 5 shows the solid line LL2, and FIG. 6 shows the one-dot chain line LL3, respectively. Needless to say, the primary delayed vertical contour component signal S1v' has the same waveform as the vertical contour component signal S1v shown in FIGS. 3, 4, 5, and 6, since it is a signal obtained by delaying the vertical contour component signal S1v for 1T.

As shown in FIG. 4, the vertical contour components on the horizontal line L1 with the first-level pixels PA have a peak on the plus side in the horizontal position sand have the zero level in other horizontal positions.

As shown in FIG. 5, the vertical contour component on the horizontal line L2 represented by the second-level pixel PB located in almost the middle (in the horizontal directions α) among the 11 first-level pixels PA has the level Lv(α) forming a large valley on the minus side in the horizontal position α. In the horizontal positions α−1 and α+1 on both sides, the vertical contour components on the horizontal line L2 have levels Lv(α−1) and Lv(α+1) on the plus side, which are larger than the peak of the line LL1. The level is approximately Lv(α−1) and Lv(α+1) in the remaining horizontal positions.

As shown in FIG. 6, it has a peak of a given quantity on the plus side in the horizontal position α, and a given minus level in other horizontal positions. has approximately the same level as the level Lv(α) of the valley.

Figure 7:
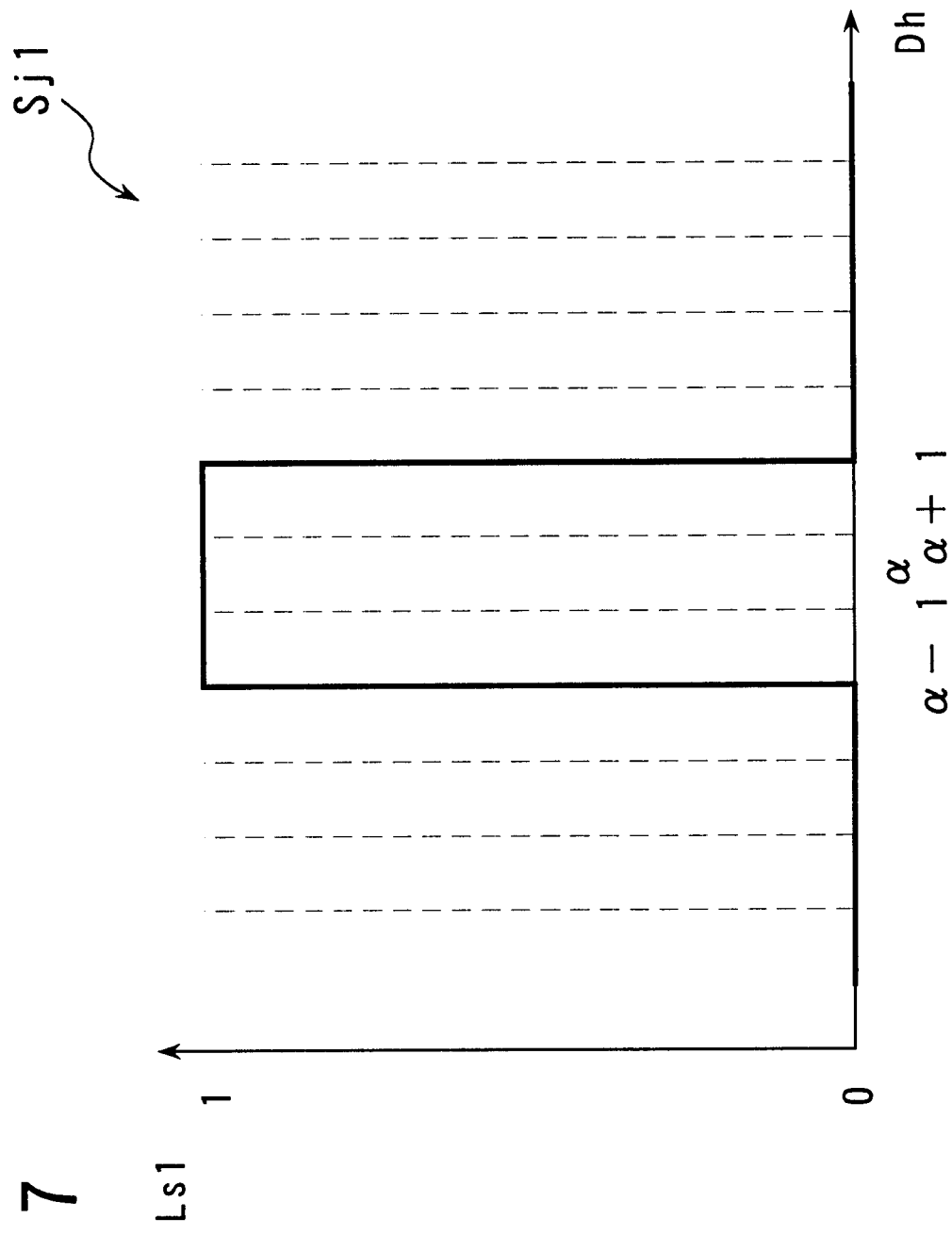
FIG. 7 is a diagram used to explain operation of the vertical contour correcting device of the first embodiment shown in FIG. 1.

FIG. 7 shows the output waveform of the decision signal Sj1 or the output from the first comparator device 4 about the horizontal line L2. As shown in FIG. 5, the signs on the line LL2 in the horizontal positions α−1 and α+1 on both sides of the horizontal position α are both plus, which is inverted at the boundary in the horizontal position α. Accordingly the level LSj1 of the decision signal Sj1 takes +1 in the horizontal positions α−1, α, and α−1.

Figure 8:
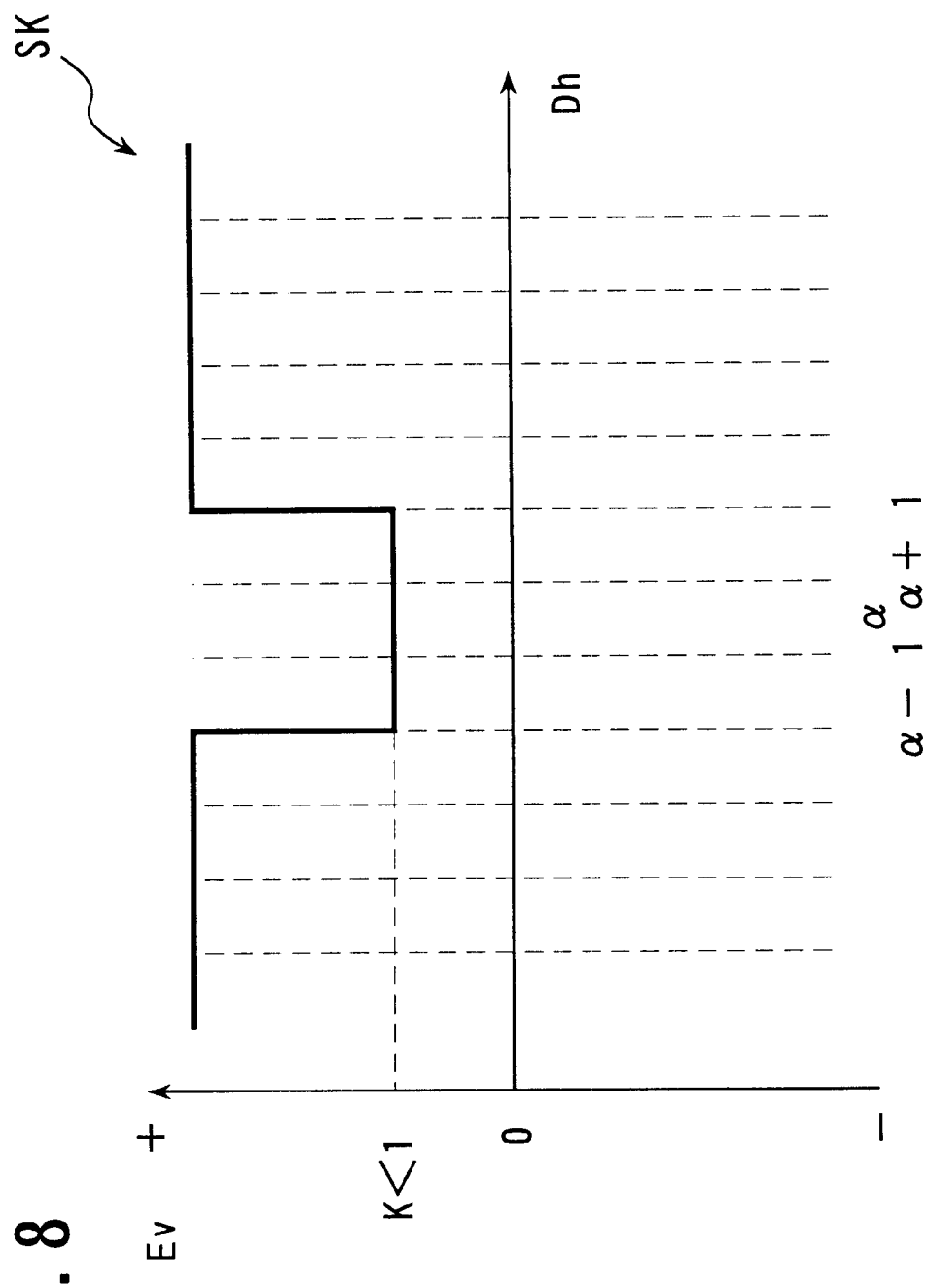
FIG. 8 is a diagram used to explain operation of the vertical contour correcting device of the first embodiment shown in FIG. 1.

FIG. 8 shows the output waveform of the coefficient setting signal SK or the output from the controller 5 about the horizontal line L2. The controller 5 appropriately determines the coefficient K in the range of 0<K<1 to attenuate the correction level to the primary delayed vertical contour component signal S1v' only for the horizontal lines α−1, α, and α+1 on the basis of the decision signal Sj1 shown in FIG. 7 and generates the coefficient setting signal SK.

Figure 9:
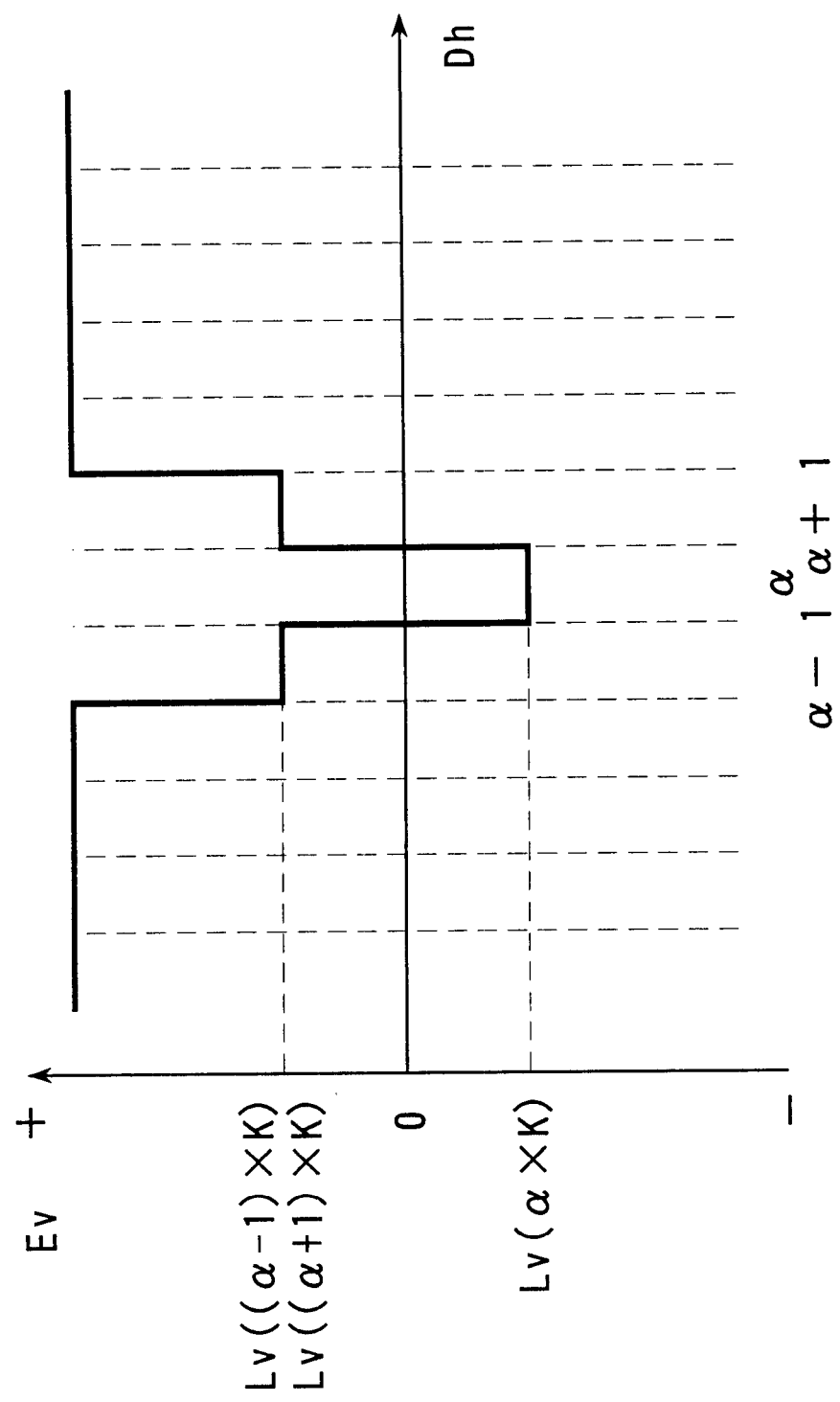
FIG. 9 is a diagram used to explain operation of the vertical contour correcting device of the first embodiment shown in FIG. 1.

FIG. 9 shows the waveform of the primary delayed vertical contour correction signal S1v'c or the output from the coefficient unit 6 about the horizontal line L2. That is to say, the primary delayed vertical contour correction signal S1v'c is resulted from multiplication of the vertical contour components of the primary delayed vertical contour component signal S1v' about the horizontal line L2 shown in FIG. 5 by the coefficient K of the coefficient setting signal SK shown in FIG. 8. Accordingly, as shown in FIG. 9, the primary delayed vertical contour correction signal S1v'c has the level Lv(α−1)×K in the horizontal position (α−1), the level Lv (α)×K in the horizontal position α, and the level Lv(α+1)×K in the horizontal position α+1.

Figure 10:
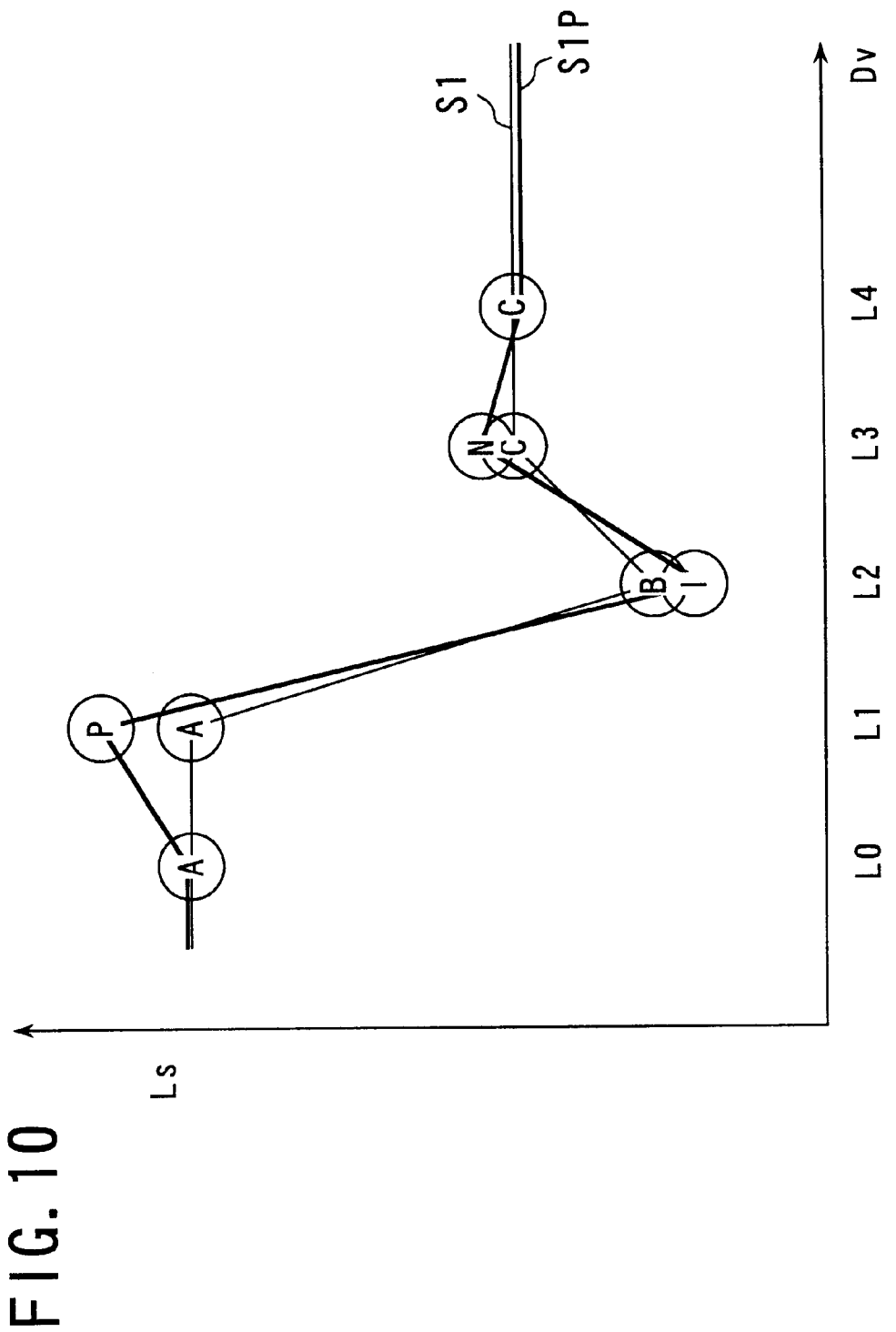
FIG. 10 is a diagram used to explain operation of the vertical contour correcting device of the first embodiment shown in FIG. 1.

FIG. 10 shows the signal levels of the digital video signal S1 or the input to the input port 1 and the vertical contour corrected video signal S1P or the output from the adder 7 in the horizontal position α. In this diagram, the ordinate shows the signal level Ls and the abscissa shows the vertical line direction Dv. In the vertical contour corrected video signal S1P, the character ○ with I indicates the signal level in the pixel as an impulse noise source and ○ with F and ○ with N indicate the signal level in the contour pixels.

As has been described referring to FIG. 9, the quantity of correction in the horizontal position acan be suppressed about the line L2, which shows that the contour pixels PA and PC can be corrected in the conventional manner while the impulse noise due to the pixel PB is suppressed.

As described above, for impulse noise having a sudden higher signal level among pixels around it, the correlation with the vertical contour components is previously known. Accordingly the enhancement of the impulse noise can effectively be suppressed by keeping the value of the vertical contour enhancement correction coefficient K constant with respect to three vertical contour components successive in the horizontal direction, as shown in FIG. 8, on the basis of the correlation signal Sj from the comparator device 4.

Similarly, the correlation with the vertical contour components is known also for step noise continuously having signal level higher than pixels around it. Accordingly, for step noise, the value of the vertical contour enhancement correction coefficient K can be properly set on the basis of the correlation shown by the decision signal Sj for vertical contour components successive in the horizontal direction. Then the present invention can be applied to suppression of enhancement of step noise in the vertical contour enhancement, similarly to that of the impulse noise.

The above-described structure allows the quantity of correction to vary when a vertical contour component corrected in the opposite direction, due to noise, to the video signal adjacent in the horizontal direction is extracted, for example, thus reducing the enhancement of the noise. Further, according to the vertical contour correcting device of this embodiment, a vertical contour correcting device which enhances vertical contour components of a video signal is characterized by varying the quantity of correction in accordance with correlation among vertical contour components adjacent in the horizontal direction extracted from the input video signal, and, when a vertical contour component corrected in the opposite direction, due to noise, to the present video signal adjacent in the horizontal direction is extracted, it can vary the quantity of correction to reduce enhancement of the noise, without considerably damaging the effect of the entire contour correction.

According to the vertical contour correcting device of this embodiment, in a vertical contour correcting device having means for inputting a video signal, extracting means for outputting vertical contour components and a delay-adjusted present video signal from the input video signal, a coefficient unit for varying said vertical contour components extracted, and an adder for adding an output of said coefficient unit and said delay-adjusted present video signal, the vertical contour components outputted from said extracting means are inputs. It is characterized by comprising a first comparator for comparing signs of the vertical contour components adjacent in horizontal direction and first control means for varying the coefficient for said coefficient unit when the signs of the correction signals adjacent in the horizontal direction are inverted, based on an output of said first comparator.

Further, when a vertical contour component corrected in the opposite direction, due to noise, to the present video signal adjacent in the horizontal direction is extracted, the quantity of correction can be varied to reduce enhancement of the noise without largely damaging the effect of the entire contour correction. In this embodiment, an impulse noise having a sudden higher signal level among the surrounding pixels was described as an example of noise component contained in a video signal to damage the image quality of the video signal subjected to the vertical contour enhancement. However, the present invention can also be applied to step noise continuously having higher signal level among surrounding pixels, such as block noise in MPEG.

That is to say, for the impulse noise and step noise, the correlation with the vertical contour components is previously known. Accordingly the noise can effectively be suppressed by properly setting the vertical contour enhancement correction coefficient K for vertical contour components successive in the horizontal direction in accordance with the type of the noise and on the basis of the correlation signal Sj1 from the comparator device 4. For example, as described above, enhancement of impulse noise can effectively be suppressed by keeping the value of the vertical contour enhancement correction coefficient K constant for three vertical contour components successive in the horizontal direction as shown in FIG. 8.

Similarly, for step noise, the vertical contour enhancement correction coefficient K can be properly set for horizontally successive vertical contour components on the basis of the decision signal Sj1. There are an infinite number of combinations of values of the vertical contour enhancement correction coefficient K for correlation between such noise and vertical contour components. Hence, although this specification has explained the impulse noise by way of example, it is easy for those skilled in the art to properly set the vertical contour enhancement correction coefficient K in accordance with correlation for step noise on the basis of the disclosure above.

FIG. 7 shows the output waveform of the decision signal Sj1 or the output from the first comparator device 4 about the horizontal line LL2. As shown in FIG. 5, the signs on the line LL2 in the horizontal positions α–1 and α+1 on both sides of the horizontal position are both plus, which are inverted at the boundary in the horizontal position α. Accordingly the level LSj1 of the decision signal Sj1 takes +1 in the horizontal positions α–1, α, and α–1.

FIG. 8 shows the output waveform of the coefficient setting signal SK or the output from the controller 5 about the horizontal line LL2. The description above has shown an impulse noise, for which the controller 5 appropriately determines the coefficient K for attenuating the correction level of the primary delayed vertical contour component signal S1v' only on the horizontal lines α–1, α, and α–1 in the range of 0≦K>1 on the basis of the decision signal Sj1 shown in FIG. 7 and generates the coefficient setting signal SK. However, the invention can be applied also to step noise which has sudden higher signal level among surrounding pixels, and such step noise includes block noise in MPEG.

(Second Embodiment)

Figure 11:
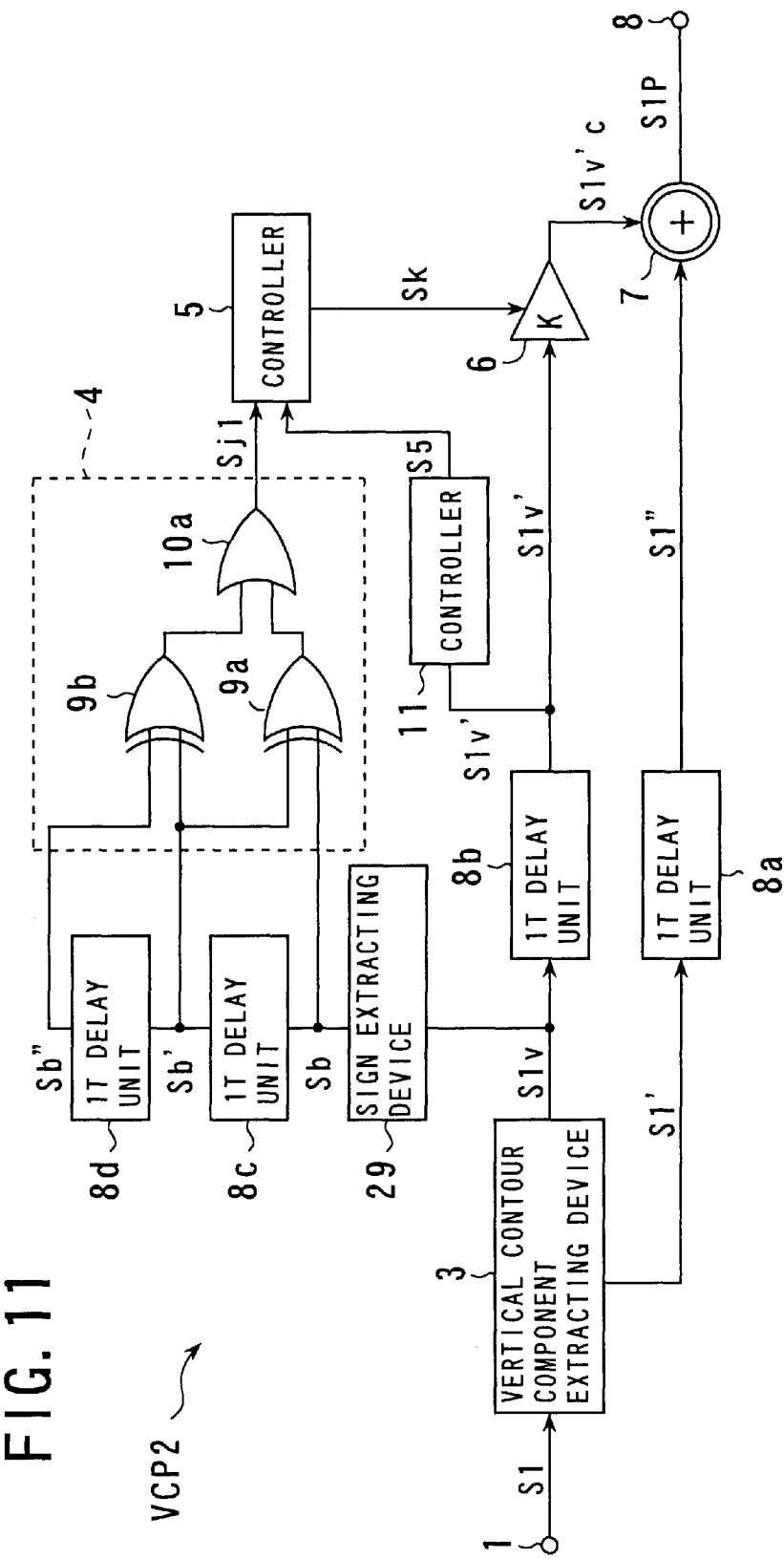
FIG. 11 is a block diagram showing the structure of a vertical contour correcting device of a second embodiment of the present invention.

Referring to FIG. 11, a vertical contour correcting device VCP2 of a second embodiment of the present invention will now be described. The vertical contour correcting device VCP2 additionally includes a second controller 11 between the output of the 1T delay unit 8b and the input of the controller 5 in the vertical contour correcting device VCP1 shown in FIG. 1. The controller 11 compares a vertical contour component of the primary delayed vertical contour component signal S1v' inputted from the second 1T delay unit 8b with a threshold Th having a previously set given value, and outputs a switching signal S5 which stops the controller 5 when said vertical contour component is equal to or lower than said threshold Th. In this case, the controller 5 does not generate the coefficient setting signal SK and therefore the primary delayed vertical contour component signal S1v' passes through the coefficient unit 6 and is outputted to the adder 7 as the primary delayed vertical contour correction signal S1v'c.

The threshold Th set in the controller 11 may be dynamically set from outside, or may be fixedly set inside. Similarly to the vertical contour enhancement correction coefficient K, the threshold Th is a quantity determined by the relation between vertical contour components and noise components in the digital video signal S1, which takes a value zero to one times the vertical contour component in the primary delayed vertical contour component signal S1v'. That is to say, the controller 5 corrects vertical contour enhancement on the basis of the correlation between vertical contour components provided by the comparator 4, and the controller 11 switches on and off the correction made by the controller 5 on the basis of the magnitude of the vertical components to enable more accurate correction.

In this way, on the basis of the switching signal S5, the controller 5 does not perform controlling operation when the vertical component in the primary delayed vertical contour component signal S1v' is equal to the threshold Th, so that when a vertical contour component corrected in the opposite direction, due to noise, to the horizontally adjacent video signal is extracted, it can be known whether it is caused by noise or is a vertical contour component in the original video signal to set the quantity of correction for the vertical contour.

The vertical contour correcting device of this embodiment is characterized in that the first control means is not operated when the correction signal inputted to the first comparing means is equal to or smaller than a given threshold, wherein when a vertical contour component corrected in the opposite direction, due to noise, to the horizontally adjacent video signal is extracted, it is possible to know whether it is caused by noise or is a vertical contour component in the original video signal to set the most suitable quantity of correction for the vertical contour.

Furthermore, the vertical contour correcting device of this embodiment is characterized by comprising second control means receiving the vertical contour component inputted to said first comparing means and for comparing a previously set threshold and the input vertical contour component, and when said vertical contour component is equal to or smaller than the given threshold, it generates a control signal to stop operation of the first control means: when a vertical contour component corrected in the opposite direction, due to noise, to horizontally adjacent video signal is extracted, it can be known whether it is caused by noise or is a vertical contour component in the original video signal, so as to set the most suitable quantity of correction for the vertical contour.

(Third Embodiment)

Figure 12:
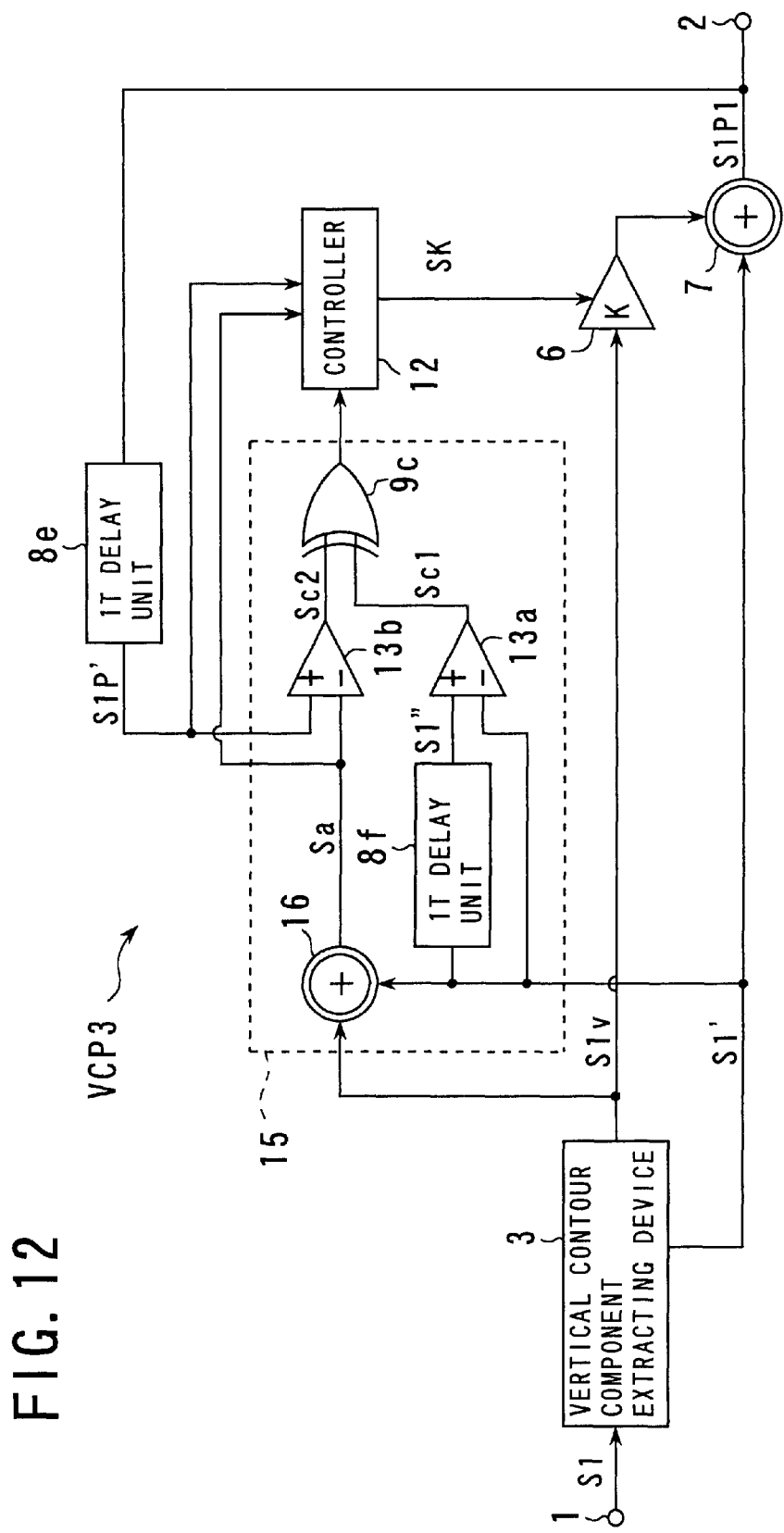
FIG. 12 is a block diagram showing the structure of a vertical contour correcting device of a third embodiment of the present invention.

Referring to FIG. 12, a vertical contour correcting device VCP3 of a third embodiment of the present invention will now be described. In the structure of the vertical contour correcting device VCP3, the first 1T delay unit 8a, second 1T delay unit 8b, third 1T delay unit 8c, fourth 1T delay unit 8d, and first comparator device 4 in the vertical contour correcting device VCP 1 shown in FIG. 1 are omitted, and it additionally includes a fifth 1T delay unit 8e and a second comparator device 15. The fifth 1T delay unit 8e is connected to the adder 7 and delays the coming vertical contour corrected video signal S1P' for 1T to generate a primary delayed vertical contour corrected video signal S1P1.

The second comparator device 15 includes a second adder 16, a sixth 1T delay unit 8f, a first comparator 13a, a second comparator 13b, and a third exclusive OR element 9c. The adder 16 is connected to the two outputs of the vertical contour extracting device 3 and adds the vertical contour component signal S1v and the primary delayed digital video signal S1' to generate a sum signal Sa. The sixth 1T delay unit 8f is connected to the vertical contour component extracting device 3 and delays the input primary delayed digital video signal S1' for 1T to generate a secondary delayed digital video signal S1".

The first comparator 13a has its plus input port connected to the sixth 1T delay unit 8f to receive input of the secondary delayed digital video signal S1" and its minus input port directly connected to the vertical contour component extracting device 3 to receive input of the primary delayed digital video signal S1'. The comparator 13a then makes a comparison to see which of the primary delayed digital video signal S1' and the secondary delayed digital video signal S1" is larger, that is, it compares magnitudes of the horizontally adjacent two video signals, and generates a first comparison signal Sc1 showing the result of the comparison.

The second comparator 13b has its plus input port connected to the fifth 1T delay unit 8e to receive input of the primary delayed vertical contour corrected video signal S1P' and its minus input port connected to the adder 16 to receive input of the sum signal Sa of the vertical contour component signal S1v and the primary delayed digital video signal S1'. The comparator 13b then compares magnitudes of the primary delayed vertical contour corrected video signal S1P' and the sum signal Sa, that is, it compares the sum signal Sa of the vertical contour component signal S1v as a vertical contour component of the digital video signal S1 and the primary delayed digital video signal S1' as a primary delayed signal of the digital video signal S1, and the primary delayed vertical contour corrected video signal S1P' obtained by delaying, for 1T, the vertical contour corrected video signal S1P one horizontal sampling time before (referred to as 1T hereinafter), and it then generates a second comparison signal Sc2 indicating the result of the comparison.

The exclusive OR element 9c has its two input ports connected to the first comparator 13a and the comparator 13b to receive inputs of the comparison signals Sc1 and Sc2, and it calculates exclusive OR thereof. By using the exclusive OR element 9c, it is checked whether the relation in magnitude between horizontally adjacent digital video signals and the relation in magnitude between the corrected video signals are inverted, and a second decision signal Sj2 is generated.

The controller 12 is connected to the fifth 1T delay unit 8e, second adder 16, and exclusive OR element 9c to receive inputs of the primary delayed vertical contour corrected video signal S1P', sum signal Sa, and second decision signal Sj2. Then, on the basis of these three signals, it determines the coefficient K for the coefficient unit 6 in such a way that the magnitude relation between video signals in the horizontal direction is not inverted before and after correction and generates the coefficient setting signal SK.

With this structure, the quantity of correction can be varied when vertical contour correction causes the magnitude relation between horizontally adjacent video signals to differ before and after the correction, for example, which reduces the noise impression caused in the video which keeps linearity in the horizontal direction.

According to the vertical contour correcting device of this embodiment, a vertical contour correcting device for enhancing vertical contour components of a video signal is characterized by varying the quantity of correction in accordance with correlation between horizontally adjacent present video signals and video signals with corrected vertical contour components, wherein when vertical contour correction causes the magnitude relation between horizontally adjacent video signals to differ from that before correction, the quantity of correction can be varied to keep the linearity of the video in the horizontal direction.

Further, according to the vertical contour correcting device of this embodiment, a vertical contour correcting device having means for inputting a video signal, extracting means for outputting vertical contour components and a delay-adjusted present video signal from the input video signal, a coefficient unit for varying the extracted vertical contour components, and an adder for adding an output of the coefficient unit and the delay-adjusted present video signal is characterized by comprising second comparing means receiving the present video signals and the video signals with corrected vertical contour components adjacent in horizontal direction, for comparing the relation in magnitude between the present video signals and the relation in magnitude between the video signals with corrected vertical contour components, and third control means for varying a coefficient inputted to the coefficient unit when, based on an output of the second comparing means, the relation in magnitude between the horizontally adjacent present video signals before correction is inverse to the relation in magnitude between the video signals after correction, wherein when the vertical contour correction causes the magnitude relation between horizontally adjacent video signals to differ from that before correction, the quantity of correction can be varied to keep the linearity in the horizontal direction of the video.

(Fourth Embodiment)

Figure 13:
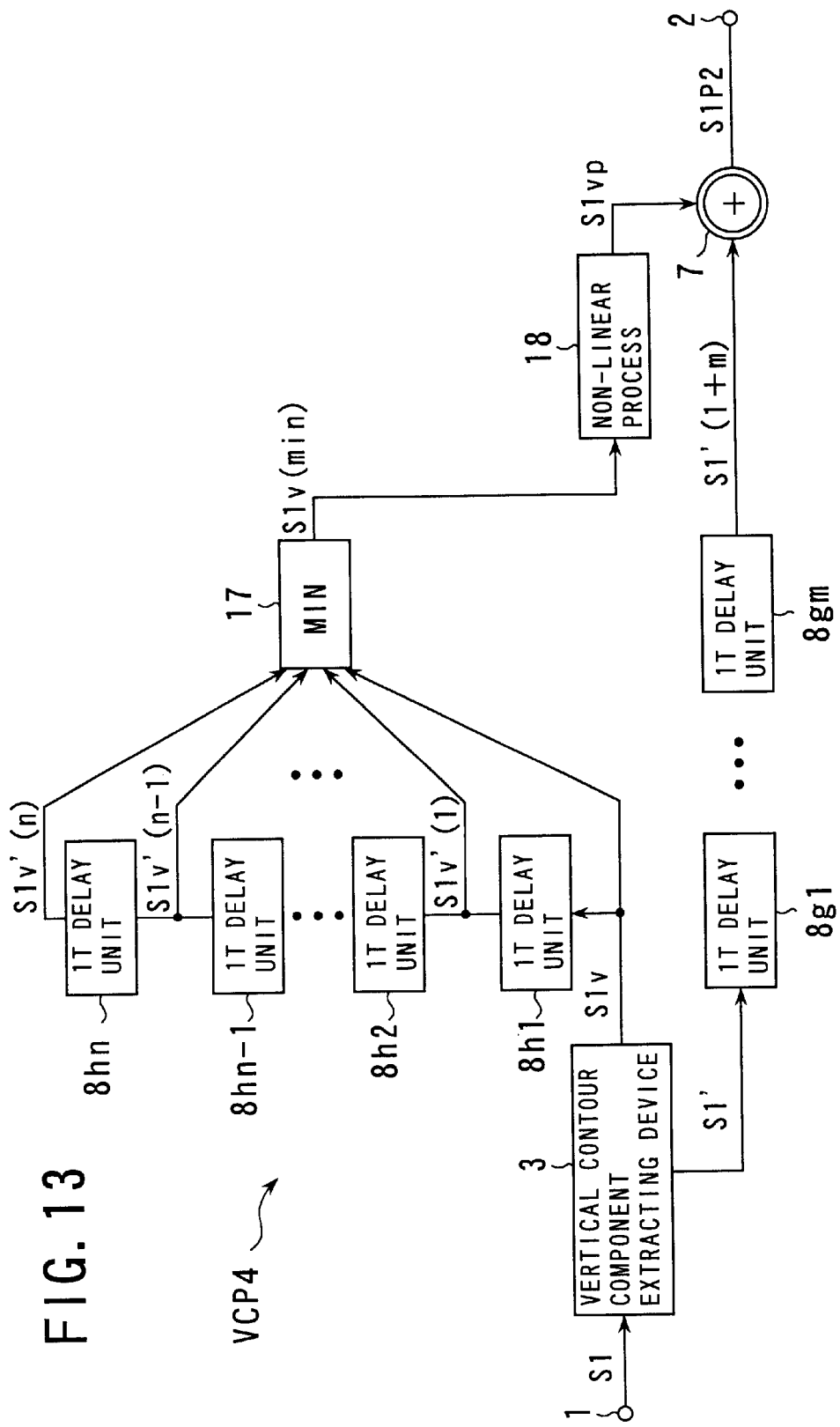
FIG. 13 is a block diagram showing the structure of a vertical contour correcting device of a fourth embodiment of the present invention.

Referring to FIG. 13, a vertical contour correcting device VCP4 of a fourth embodiment of the present invention will now be described. The vertical contour correcting device VCP4 has an input port 1, an output port 2, a vertical contour component extracting device 3, an adder 7, m 1T delay units 8g1 to 8gm (m is an integer), n 1T delay units 8h1 to 8hn (n is an integer), a minimum value detector 17, and a non-linear processor 18. These elements except the minimum value detector 17 are structured in the same way as those described referring to FIGS. 1 and 19. The vertical contour component extracting device 3 is connected to the input port 1 and generates the primary delayed digital video signal S1' and the vertical contour component signal S1v on the basis of the input digital video signal S1.

The m 1T delay units 8g1 to 8gm are connected in series to the vertical contour component extracting device 3 to sequentially delay the coming primary delayed digital video signal S1', each for 1T, and the mth 1T delay unit 8gm outputs a (1+m) th delayed digital video signal S1' (1+m).

The n 1T delay units 8h1 to 8hn are connected in series to the vertical contour component extracting device 3 to sequentially delay the input vertical contour component signal S1v, each for 1T, to generate a primary delayed vertical contour component signal S1v' to an mth delayed primary delayed vertical contour component signal S1v'(m). That is to say, it obtains horizontally adjacent m vertical contour components.

The minimum value detector 17 is connected to the output ports of the n 1T delay units 8h1 to 8hn to receive inputs of the primary delayed vertical contour component signal S1v'(1) to nth delayed primary delayed vertical contour component signal S1v'(n). The minimum value detector 17 is also connected to the output port of the vertical contour component extracting device 3 to receive input of the vertical contour component signal S1v. Then the minimum value detector 17 detects the minimum value among the horizontally adjacent n+1 vertical contour components, the n delayed vertical component signals S1v'(1) to S1v'(n) and the vertical contour component signal S1v, and outputs it as a minimum vertical contour component signal S1v (min). The minimum value detector 17 is provided with sign discrimination, which can determine the minimum value even among pixels with inverted signs. This sign discrimination may be achieved by using the sign extracting device 29 shown in FIG. 1.

The non-linear processor 18 is connected to the minimum value detector 17 and generates a vertical contour correction signal S1vp on the basis of the input vertical contour component signal S1vmin.

The adder 7 is connected to the 1T delay unit 8gm and the non-linear processor 18 to receive inputs of the (1+m)th delayed digital video signal S1' (1+m) and the vertical contour correction signal S1vp. The adder 7 then adds these signals to generate a vertical contour corrected video signal S1P2 with vertically outlined contour.

This structure can reduce enhancement of noise when a vertical contour component of a video signal becomes very larger than horizontally adjacent pixels due to impulse type noise, which was difficult to reduce with a conventional horizontal low-pass filter, for example.

According to the vertical contour correcting device of this embodiment, a vertical contour correcting device for enhancing vertical contour components of a video signal is characterized by detecting the minimum value from among vertical contour components extracted from an input video signal by using a plurality of delay units and a minimum value detector and using the detected minimum value as a correction signal, which can reduce enhancement of noise when a vertical contour component of a video signal becomes very larger than horizontally adjacent pixels due to impulse type noise, which was difficult to reduce with a conventional horizontal low-pass filter.

According to the vertical contour correcting device of this embodiment, a vertical contour correcting device having means for inputting a video signal, extracting means for outputting vertical contour components and a delay-adjusted present video signal from the input video signal, means having a coring circuit, a horizontal low-pass filter circuit, a coefficient unit, and a limiter, for sequentially inputting the extracted vertical contour components to said circuits and extracting a vertical contour correction signal, and an adder for adding the vertical contour correction signal and the delay-adjusted present video signal is characterized by comprising a first group of n, at least two, delay units receiving the vertical contour components extracted by the extracting means, first minimum value detecting means receiving the vertical contour components outputted from the first delay unit group, for outputting a minimum value thereof, and a second group of a plurality of, at least two, delay units for delay-adjusting the present signal, which can reduce enhancement of noise when a vertical contour component of a video signal becomes very larger than horizontally adjacent pixels due to impulse type noise, which was difficult to reduce with a conventional horizontal low-pass filter.

Figure 14:
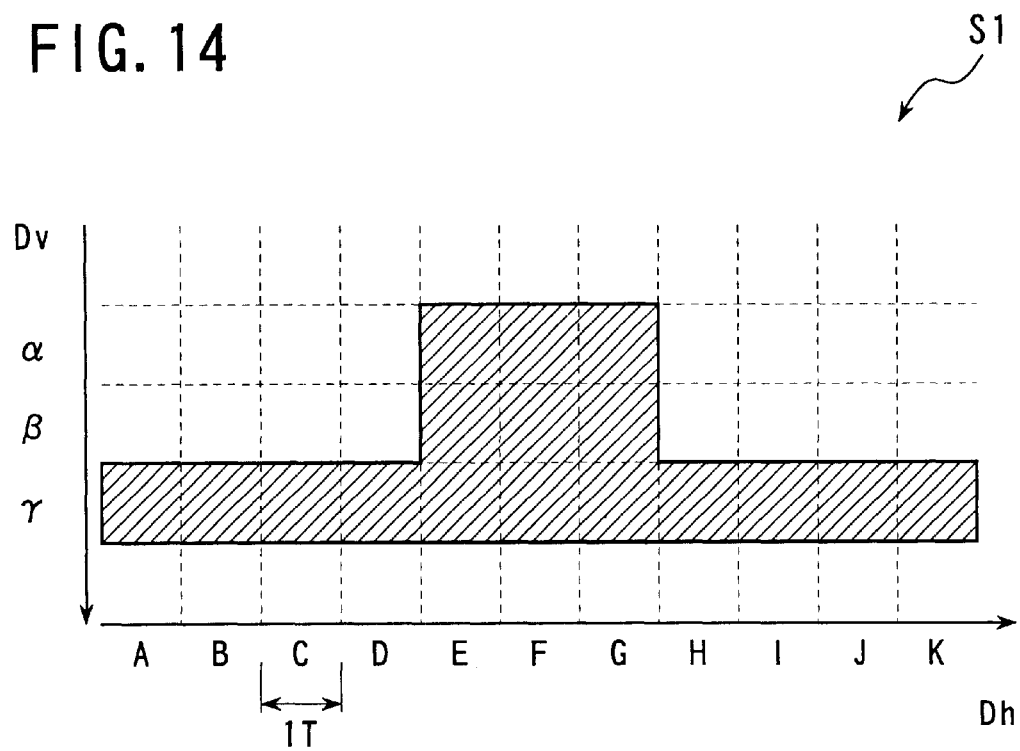
FIG. 14 is a diagram used to explain operation of the vertical contour correcting device of the fourth embodiment shown in FIG. 13.

Referring to FIGS. 14, 15, 16, 17, and 18, the operation of the vertical contour correcting device VCP4 in the embodiment will now be described. In FIGS. 14, 15, 16, 17 and 18, the ordinate shows lines in the vertical direction Dv in the image, and the abscissa shows lines in the horizontal direction Dh. In FIG. 14, pixels representing the image of the digital video signal S1 are shown by oblique lines. That is to say, for the pixels on the line α in the vertical direction (Dv), the pixels in the horizontal direction (Dh) on the three lines E, F, and G represent the image. Similarly, for the pixels on the line β in the vertical direction (Dv), the pixels in the horizontal direction (Dh) on the three lines E, F, and G represent the image. For the pixels on the line γ in the vertical direction (Dv), the pixels in the horizontal direction (Dh) on the 11 lines A, B, C, D, E, F, G, H, I, J, and K represent the image.

Figure 15:
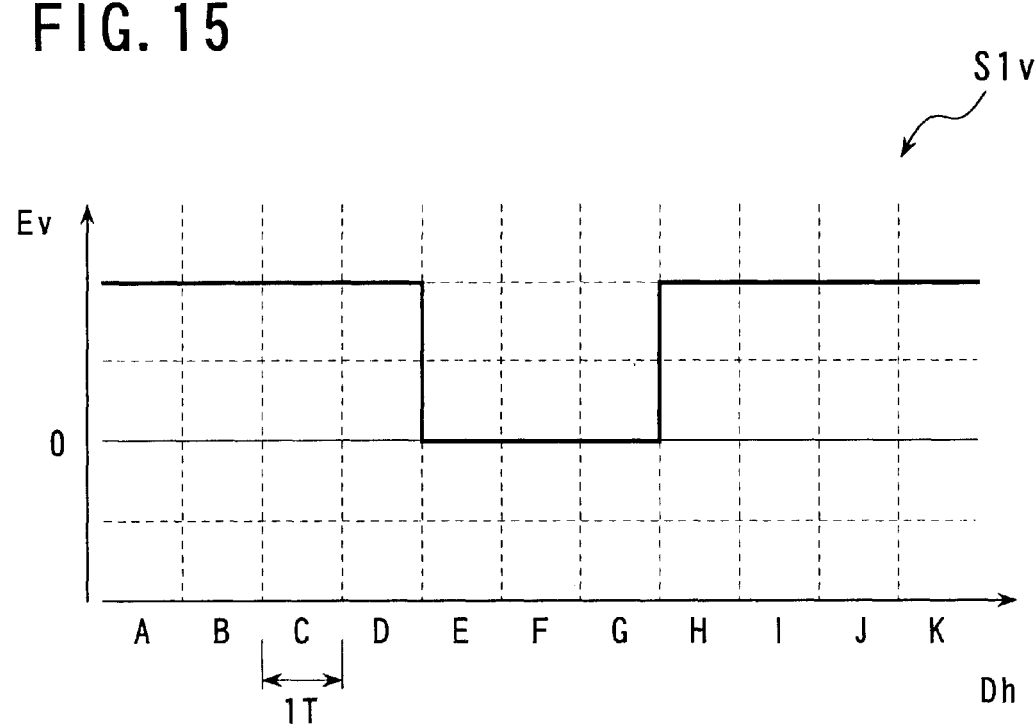
FIG. 15 is a diagram used to explain operation of the vertical contour correcting device of the fourth embodiment shown in FIG. 13.

FIG. 15 shows the vertical contour component signal S1v. In this diagram, the ordinate shows the level of the vertical contour components Ev, and the abscissa shows lines in the horizontal direction Dh, similarly to FIG. 14.

In FIG. 13, the vertical contour component signal S1v outputted the vertical contour component extracting portion 3 is sequentially inputted to the plurality of, at least two, 1T delays to obtain vertical contour components adjacent in the horizontal direction. They are inputted to the minimum value detector 17 and the minimum value is outputted. The minimum value detector 17 is a kind of horizontal minimum value filter, which is constructed in such a way that the number of its horizontal taps is equal to the number of taps of the horizontal low-pass filter 26 performed in the non-linear processor output 18. The minimum vertical contour component signal S1v(min) outputted by selecting the minimum value from among the delayed vertical contour component signals S1v'(1) to S1v'(n) from the n 1T delay units 8h1 to 8hn is delayed by n/2 lines with respect to the vertical contour component signal S1v and the primary delayed digital video signal S1'.

Thus, when the number of taps of the horizontal low-pass filter 26 in the non-linear processor 18 is equal to the number, n, of the 1T delay units 8h1 to 8hn, the delay time in the non-linear processor 18 also corresponds to n/2 lines. That is to say, the vertical contour component signal S1vP outputted from the non-linear processor 18 is delayed by n·T with respect to the vertical contour component signal S1v and the primary delayed digital video signal S1'. Hence, the number, m, of the 1T delay units 8g1 to 8gm is set equal to n in order to match the time of the delayed digital video signal S1' (m+1) with the vertical contour component signal S1vP. In this way, when the number of horizontal taps of the non-linear processor 18 and the number of taps of the horizontal low-pass filter 26 of the non-linear processor 18 are the same number n, the presence of the m, which is equal to n, 1T delay units 8g1 to 8gm between the vertical contour component extracting device 3 and the adder 7 suppresses extension of the vertical contour correction signal to image originally not corrected.

Figure 16:
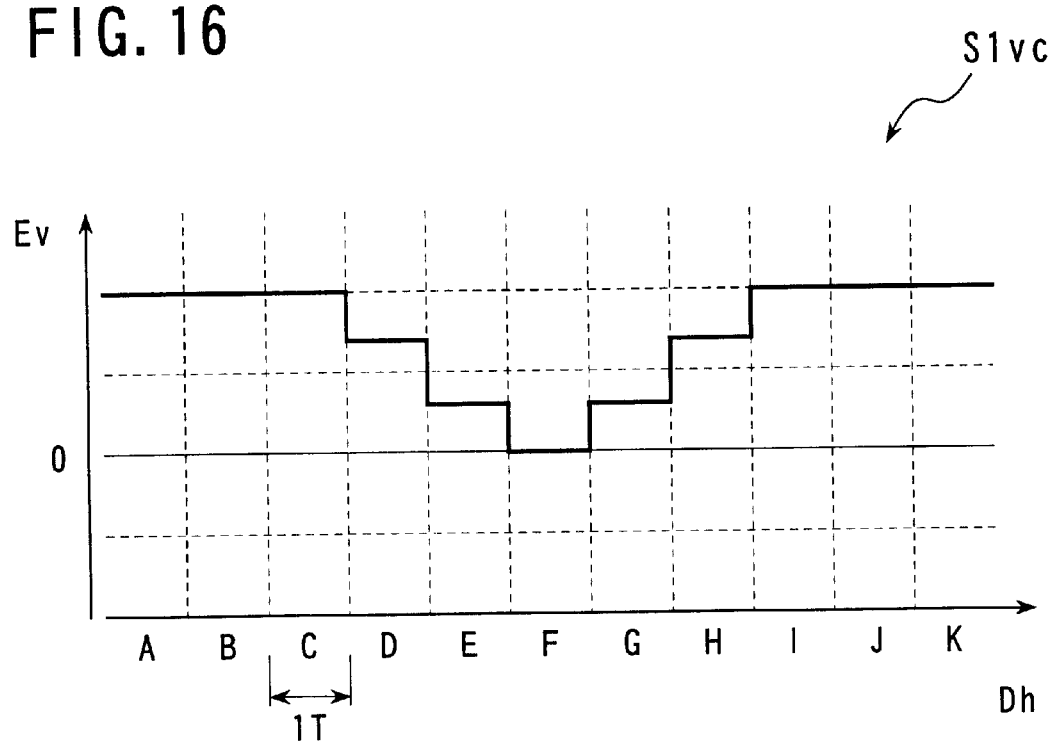
FIG. 16 is a diagram used to explain operation of the vertical contour correcting device of the fourth embodiment shown in FIG. 13.

Now an example in which the number of steps of the horizontal low-pass filter is three will be described referring to FIGS. 14 and 15. First, FIG. 14 shows the digital video signal S1 inputted to the input port 1. The vertical contour component signal S1v on the line β shown in FIG. 14 is provided as shown in FIG. 15. When the non-linear processing by the non-linear processor 18 is applied to the vertical contour component signal S1v, the vertical contour correction signal S1vc (FIG. 19) is provided as shown in FIG. 16.

Figure 17:
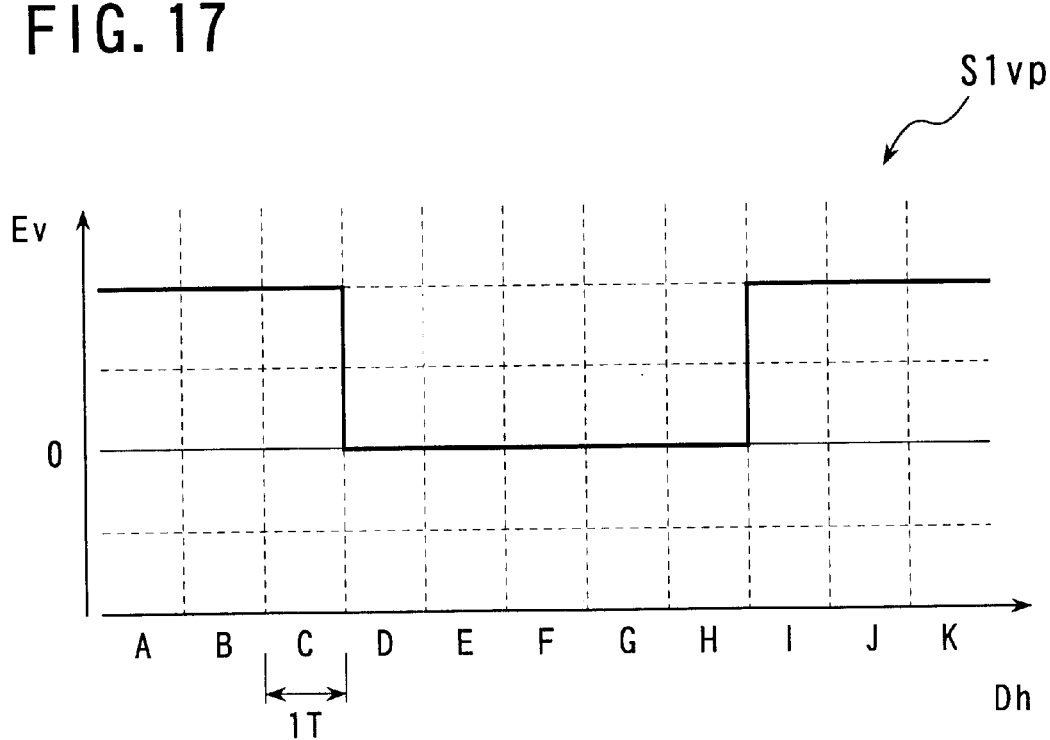
FIG. 17 is a diagram used to explain operation of the vertical contour correcting device of the fourth embodiment shown in FIG. 13.
Figure 18:
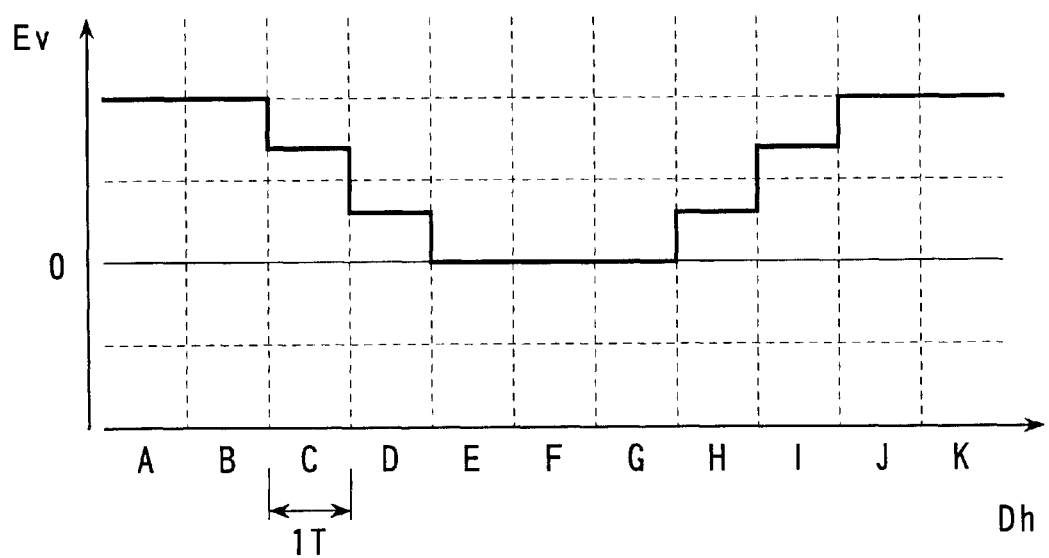
FIG. 18 is a diagram used to explain operation of the vertical contour correcting device of the fourth embodiment shown in FIG. 13.

In this case, the horizontal low-pass filter 26 in the non-linear processor 18 extends the correction to the area not requiring correction, or to the vertical contour components on the horizontal direction lines E and F. FIG. 17 shows the vertical contour components of the vertical contour component signal S1v(min) from the minimum value detector 17, with the minimum value detection in the range of horizontal three pixels. That is to say, the vertical contour components on the horizontal direction line D to H are at the same level. FIG. 18 shows the vertical contour components of the vertical contour correction signal S1vc obtained by passing such vertical contour component signal S1 v(min) through the 3-tap horizontal low-pass filter in the non-linear processor 18. In this diagram, the vertical contour components on the horizontal direction line E and G, the original contour, are the same as that on the line F. In this way, it is possible to suppress extension of the vertical contour correction signal to video originally not corrected.

This structure can suppress extension of the vertical contour correction signal by the horizontal low-pass filter. Further, the vertical contour correcting device of this embodiment is characterized in that the horizontal delay time (the number of horizontal taps) in the minimum value detector is equal to the horizontal delay time (the number of horizontal filter taps) in the horizontal low-pass filter, which can suppress extension of the vertical contour correction signal by the horizontal low-pass filter.

Moreover, the vertical contour correcting device of this embodiment is characterized by comprising a second minimum value detector, said first delay unit group having the same number of taps as said horizontal low-pass filter, and a second delay unit group which delays said present signal for the same time as the delay in said second minimum value detector, which can suppress extension of the vertical contour correction signal by the horizontal low-pass filter.

Industrial Applicability

The present invention is suitable to a vertical contour correcting device which applies enhancement correction to vertical contour of an image while suppressing noise of the image in an image display device such as a computer display, a television receiver, etc.

What is claimed is:

1. A vertical contour correcting device which corrects vertical contour components of a video signal to enhance vertical contour of said video signal, said vertical contour correcting device comprising:

correlation detecting means for detecting correlation between a noise component contained in said video signal and said vertical contour components, said correlation detecting means comprises, a vertical contour component extracting means for extracting vertical contour components adjacent in horizontal direction from said video signal, and a horizontal correlation detecting means for detecting correlation between said detected vertical contour components adjacent in the horizontal direction, said horizontal correlation detecting means comprises a sign extracting means for extracting signs of said vertical contour components adjacent in the horizontal direction, and a sign comparing means for comparing said extracted signs; and quantity of correction varying means for varying the quantity of correction of said vertical contour components on the basis of said correlation, thereby enhancing said vertical contour without enhancing said noise component;

wherein said quantity of correction varying means varies said quantity of correction when the signs of said vertical contour components adjacent in the horizontal direction are inverted.

2. The vertical contour correcting device according to claim 1, wherein when said vertical contour components are smaller than said threshold, said vertical contour component quantity checking means generates a control signal to stop operation of said quantity of correction varying means.

3. A vertical contour correcting device which corrects vertical contour components of a video signal with a given quantity of correction to enhance vertical contour of said video signal, said vertical contour correcting device comprising:

vertical contour component extracting means for extracting a delayed video signal by delay-adjusting said vertical contour components from said video signal;

correcting means for varying said vertical contour components to generate a correction signal;

adding means for adding said correction signal and said delayed video signal to generate a vertical contour corrected video signal;

comparing means for comparing magnitude relation between delayed video signal components and magnitude relation of said vertical contour corrected video signals, said video signal components adjacent in horizontal direction extracted from said delayed video signal and said vertical contour corrected video signal being inputted thereto; and control means for varying the quantity of correction of said correcting means when the magnitude relation between said horizontally adjacent video signal components is inverse to the magnitude relation in said vertical contour corrected video signal, based on an output from said comparing means.

4. A vertical contour correcting device which corrects vertical contour components of a video signal with a given quantity of correction to enhance vertical contour of said video signal, said vertical contour correcting device comprising:

vertical contour component extracting means for generating a delayed video signal by delaying the vertical contour components from said video signal;

a plurality of first delay means for sequentially delaying said vertical contour components to generate a plurality of delayed vertical contour component signals, minimum value detecting means connected to said plurality of first delay means for detecting a minimum value among said plurality of delayed vertical contour component signals; and correcting means which uses the minimum value among said delayed vertical contour component signals as said quantity of correction.

5. The vertical contour correcting device according to claim 4, wherein said correcting means comprises, a coring circuit for coring the minimum value of said delayed vertical contour component signals, horizontal low-pass filter means for horizontal low-pass filtering to said cored minimum value of the delayed vertical contour component signals, coefficient means for multiplying said minimum value subjected to said horizontal low-pass filter by a given coefficient, and limiter means for limiting band of the minimum value multiplied by said coefficient, and wherein said vertical contour correcting device further comprises, a plurality of second delay means for sequentially delaying said delayed video signal to generate a second delayed video signal, and adding means for adding said second delayed video signal and said quantity of correction to generate a vertical contour corrected video signal.

6. The vertical contour correcting device according to claim 5, wherein said minimum value detecting means and said horizontal low-pass filter have equal horizontal delay times, and wherein said plurality of second delay means have a delay time equal to a sum of the horizontal delay time in said minimum value detecting means and the horizontal delay time in said horizontal low-pass filter.

7. A vertical contour correcting method which corrects vertical contour components of a video signal with a given quantity of correction to enhance vertical contour of said video signal, said method comprising:

a vertical contour component extracting step of extracting a delayed video signal by delay-adjusting said vertical contour components from said video signal;

a correcting step of varying said vertical contour components to generate a correction signal;

an adding step of adding said correction signal and said delayed video signal to generate a vertical contour corrected video signal;

a step of inputting video signal components adjacent in horizontal direction extracted from said detected delayed video signal and said vertical contour corrected video signal, a comparing step of comparing a magnitude relation between said delayed video signal components and magnitude relation in said vertical contour corrected video signal; and a control step of varying the quantity of correction in said correcting step when the magnitude relation between said horizontally adjacent video signal components is inverse to the magnitude relation in said vertical contour corrected video signal, based on an output from said comparing step.

8. A vertical contour correcting method which corrects vertical contour components of a video signal with a given quantity of correction to enhance vertical contour of said video signal, said method comprising:

a vertical contour component extracting step of generating a delayed video signal by delaying the vertical contour components from said video signal;

a first delay step of sequentially delaying said vertical contour components to generate a plurality of delayed vertical contour component signals;

a minimum value detecting step for detecting a minimum value among said plurality of delayed vertical contour component signals; and a correcting step which uses said detected minimum value among the delayed vertical contour component signals as said quantity of correction.

9. The vertical contour correcting method according to claim 8, wherein said correcting step comprises a coring step of coring said minimum value of the delayed vertical contour component signals, a horizontal low-pass filtering step of horizontal low-pass filtering said cored minimum value of the delayed vertical contour component signals, a coefficient step of multiplying said minimum value subjected to said horizontal low-pass filtering by a given coefficient, and a limit step of limiting band of the minimum value multiplied by said coefficient, and wherein said vertical contour correcting method further comprises a second delay step of sequentially delaying said delayed video signal to generate a second delayed video signal, and an adding step of adding said second delayed video signal delayed video signal and said quantity of correction to generate a vertical contour corrected video signal.

10. The vertical contour correcting method according to claim 9, wherein said minimum value detecting step and said horizontal low-pass filtering step have equal horizontal delay times, and said plurality of second delay steps have a delay time equal to a sum of the horizontal delay time in said minimum value detecting step and the horizontal delay time in said horizontal low-pass filtering step.

11. A vertical contour correcting method which corrects vertical contour components of a video signal to enhance vertical contour of said video signal, said method comprising:

a correlation detecting step of detecting correlation between a noise component contained in said video signal and said detected vertical contour components, said correlation detecting step comprises a vertical contour component detecting step of detecting vertical contour components adjacent in horizontal direction from said video signal, and a horizontal correlation detecting step of detecting correlation between said detected vertical contour components adjacent in the horizontal direction, said horizontal correlation detecting step comprises a sign extracting step of extracting signs of said vertical contour components adjacent in the horizontal direction, and a sign comparing step of comparing said extracted signs; and a quantity of correction varying step of varying the quantity of correction of said vertical contour components on the basis of said correlation, thereby enhancing said vertical contour without enhancing said noise, said quantity of correction varying means varies said quantity of correction when the signs of said vertical contour components adjacent in the horizontal direction are inverted.

12. The vertical contour correcting method according to claim 11, wherein when said vertical contour component is smaller than said threshold, said vertical contour component quantity checking step generates a control signal to stop said quantity of correction varying step.

* * * * *

UNITED STATES PATENT AND TRADEMARK OFFICE
CERTIFICATE OF CORRECTION

PATENT NO.    : 6,424,383 B1
DATED         : July 23, 2002
INVENTOR(S)   : Katsumi Terai et al.

It is certified that error appears in the above-identified patent and that said Letters Patent is hereby corrected as shown below:

<u>Title page,</u>
Item [22], change "Aug. 24, 1999" to -- Aug. 24, 1998 --.

Signed and Sealed this

Fifteenth Day of April, 2003

JAMES E. ROGAN
*Director of the United States Patent and Trademark Office*